US008820481B2

(12) United States Patent
Brucia

(10) Patent No.: US 8,820,481 B2
(45) Date of Patent: Sep. 2, 2014

(54) CENTER STORE DESIGN, METHOD AND ARRANGEMENT FOR RETAIL MARKETS

(75) Inventor: Lawrence J. Brucia, San Anselmo, CA (US)

(73) Assignee: Lawrence J. Brucia, San Anselmo, CA (US)

(*) Notice: Subject to any disclaimer, the term of this patent is extended or adjusted under 35 U.S.C. 154(b) by 0 days.

(21) Appl. No.: 13/431,927

(22) Filed: Mar. 27, 2012

(65) Prior Publication Data

US 2012/0241395 A1    Sep. 27, 2012

Related U.S. Application Data

(60) Provisional application No. 61/468,050, filed on Mar. 27, 2012.

(51) Int. Cl.
| | | |
|---|---|---|
| *A61F 13/15* | (2006.01) | |
| *E04H 3/00* | (2006.01) | |
| *E04H 3/02* | (2006.01) | |
| *E04H 3/04* | (2006.01) | |
| *A47B 91/06* | (2006.01) | |
| *B60B 33/08* | (2006.01) | |
| *A47F 11/00* | (2006.01) | |

(52) U.S. Cl.
 CPC ............... *A47F 11/00* (2013.01); *A47B 91/06* (2013.01); *B60B 33/08* (2013.01)
 USPC .... 186/52; 248/188.1; 248/188.2; 248/188.4; 16/22; 16/26; 108/147.22

(58) Field of Classification Search
 CPC ......... A47F 10/00; A47F 10/02; A47F 10/04; A47F 11/00; A47B 91/06; B60B 33/08; B60T 3/00; E04H 3/04
 USPC .......... 248/188.1, 188.2, 188.4, 188.7, 188.8, 248/161; 16/22, 26; 108/144.11, 147.22; 186/52
 See application file for complete search history.

(56) References Cited

U.S. PATENT DOCUMENTS

| 1,461,374 | A | * | 7/1923 | Anderson | 52/33 |
|---|---|---|---|---|---|
| RE17,178 | E | * | 1/1929 | Trapp | 52/33 |
| 2,285,962 | A | * | 6/1942 | Foulkes | 52/29 |
| 3,992,824 | A | * | 11/1976 | Miller, Jr. | 52/29 |
| 4,288,948 | A | * | 9/1981 | Harris | 52/28 |
| 4,472,912 | A | * | 9/1984 | Pipp | 52/28 |

(Continued)

OTHER PUBLICATIONS

Underhill, Paco, Copyright 1999, Simon and Schuster, New York, Ny, pp. 78-85.*

*Primary Examiner* — Jeffrey Shapiro
(74) *Attorney, Agent, or Firm* — IPxLaw Group LLP

(57) ABSTRACT

A shelving layout concept which allows selective configuration and reconfiguration of the orientation of certain shelving systems within the central portion of a store to create a PrimeZone area including an assembly of End Caps, Center Caps, Power Sets, Corner Boards, Hot Spots and Banner Boards, the combination of which provides a solution for enabling retailers to re-invigorate their Center Store, increase their vendor promotional revenue, and increase their in-store sales due to more favorable consumer response to greater promotional activity and the continuing change of product venues in key areas of the store layout. The concept also includes novel hardware which enables the reconfiguration of the shelving layout to accommodate vendors' desire to change display schemes.

21 Claims, 18 Drawing Sheets

(56) References Cited

U.S. PATENT DOCUMENTS

| | | | |
|---|---|---|---|
| 5,871,108 A * | 2/1999 | White | 211/186 |
| 6,715,308 B2 * | 4/2004 | Grimm et al. | 62/246 |
| 2003/0051749 A1 * | 3/2003 | Baughman et al. | 135/87 |
| 2003/0115716 A1 * | 6/2003 | Polevoy et al. | 16/26 |
| 2004/0211741 A1 * | 10/2004 | Bustos et al. | 211/187 |
| 2006/0010030 A1 * | 1/2006 | Sorensen | 705/10 |
| 2006/0186288 A1 * | 8/2006 | Levine et al. | 248/188.2 |
| 2009/0114481 A1 * | 5/2009 | Tejada et al. | 186/52 |

* cited by examiner

CENTER STORE DESIGN, METHOD AND ARRANGEMENT FOR RETAIL MARKETS

BACKGROUND OF THE INVENTION

The present invention relates generally to retail store interior design, and more specifically to a novel and improved layout of the shelving and other means for holding and displaying goods for sale in a PrimeZone portion of the central space of the store.

The present invention has broad applicability to many types of retail establishments in which a wide variety of goods have historically been placed on long rows of parallel racks or shelves orderly arranged most often within a central portion of a large open room defined by exterior walls. In most cases, special purpose rooms or areas are positioned around the central space and proximate the surrounding walls. Grocery stores selling packaged comestibles, household goods and other products are an example of such establishment, but many other types of retail stores follow a similar pattern and as will be apparent to the reader, the present invention has broad applicability . . . .

As generally illustrated in FIG. 1 of the present Drawing, a typical grocery store, schematically represented at 10, is usually configured to include four basic components; namely, a "Backroom" area 12 that is usually at the back of the store and used for the receiving and storage of product prior to its movement out to the display area; a "Front End" area 14, usually located at the front of the store close to the front doors 16 and often the area in which cash registers or other check out facilities are positioned; a "Perimeter" area 18 that is sometimes called the perishable perimeter because it typically includes the meat, seafood, produce, dairy, deli, floral, and bakery departments; and a "Center Store" area 20 in the center of the store and which typically includes long rows of parallel shelving systems 22 wherein grocery, frozen and refrigerated products, health and beauty Aids, wine, liquor, and bulk items are displayed for sale. The shelving systems 22 are typically comprised of a plurality of movable or non-movable shelving units 23 affixed together back-to-back and in series to form the several rows of double-sided shelves shown in FIG. 1. Shelving units which are intended to be movable are often referred to as "gondolas".

Alternatively, there are some retail store configurations that comingle the various departments throughout the store due to store shell format, or for merchandising differentiation from other stores. For example, the produce area normally located in the Perimeter area 16 may be positioned to replace all or part of a normal aisle shelving system and extend down the middle of the center part of the store rather than along the inside perimeter of the store building. But even in such layouts, the produce cases are typically arrayed in linear formats forming straight lines within the center of the store.

The Center Store area has traditionally been a difficult and boring area of the store compared to the produce, deli and bakery sections because its long aisles of shelving usually do not stimulate the consumer to purchase other or more product than he or she came to buy.

The aisle spaces 24 are usually 5 to 7 feet in width, so as to allow shopping carts to pass, and the shelving systems can be as high as 86". Most contemporary shelving systems include 7 or 8 shelves aligned and tied together in a row. Long rows of canned foods, packaged goods and glass doors with product in frozen and refrigerated cases normally do not stimulate consumers to spend more of their money in the store than they would normally spend to accommodate their needs.

Center Store aisles are typically viewed by consumers as shelf-lined walk ways along which consumers can walk to find a product, put it in their shopping cart or basket, and then move on to the next aisle to select the next product on their shopping list. The consumer typically does not linger or explore these aisles as they are more likely to do in a specialty cheese or bakery section.

When a traditionally configured new Center Store area is planned, the shelving layout is normally designed to incorporate one of the two major brands of linear shelving systems that lead the industry. These systems are typically comprised of a plurality of discrete shelving or other product display units that, once set in place, are almost never moved during the lifespan of the store, unless there is a complete remodel of the establishment. The reasons these shelving systems are almost never moved is because they have historically not been designed to move, and the normal practice of the retail industry has not been to move them. That is why nearly all Center Store shelving systems include shelving units, refrigerated units and product display cabinets are placed in long parallel straight lines creating straight aisles for consumers to walk through.

Within the Center Store, a shopper expects to find all of the major product categories including soups, pastas, condiments, paper goods, detergents, beverages, frozen foods, refrigerated foods, specialty and gourmet products, rice, beans, household products, bulk product, coffee, teas, snacks, etc., grouped together by type or category of product.

Promotional activity within the Center Store is usually limited to materials making special announcements connected to the shelves of the shelving systems and on-the-shelf promotion which includes tags promoting the product, coupon dispensers, sampling dispensers, advertising signs and shelf talkers.

A consumer, upon entering an aisle with parallel positioned shelving systems extending on both sides thereof, is typically looking for specific items and then moving on to the next aisle, and usually pays little attention to advertising. It is thus a challenge for companies marketing Consumer Product Goods (CPG) to get the attention of the consumer in such linear aisles.

Promotional activity within a store sometimes includes signage on the floor at the entrance to an aisle, or perhaps banners extending across the aisle overhead announcing a promotion. But these floor placed signs and overhead banners are usually not particularly effective because they are not directly in the line of sight of the consumer walking through the aisle and thus not well focused on the product offerings on the shelves.

The most effective and highly coveted promotional locations within the traditional Center Store are the 3 or 4 foot areas at the end of each aisle in which transversely extending shelving or display cases 26 can be positioned. These shelf end display facilities are called "End Caps" and can readily be seen by consumers from a distance as well as when they enter an adjacent aisle. In fact, it is fair to say that nearly all consumers will see or at least glance at an End Cap product offering of specials and/or promotions by a CPG purveyor, or the store itself in promoting its Private Label brands.

In fact, it is not unusual for CPG companies to pay significant sums of money to the store for the right to display their products on an End Cap for a one or two week period. This is usually the case within the larger national chain stores wherein typical Center Store sales, on a national average, represent 66% of the total store sales. This can of course vary depending on the geographical location of the store.

However, Center Store sales have been declining for traditional grocery store chains over the past 10 years or so, due to the intense competition from the large national and international discounters. Supermarkets simply cannot price-wise compete against the discounters on many Center Store items, so have accepted this fact and have tried other concepts to promote their products. For example, many supermarkets have chosen to focus on the store Perimeter area wherein they feel they can compete more favorably with the discounters. But most have experienced little improvement.

As discussed above. supermarket design for the Center Store has been the same for as long as there have been supermarkets, i.e., straight aisles with straight rows of gondolas or fixed shelving holding the products, or straight rows of refrigerated or frozen food cases. Although the large vendors will pay for the privilege of having their product displayed at the end of the aisle on End Caps, where their product can be easily seen by most anyone coming into the store, there are very little other areas of the store for these vendors to promote their items other than on the shelves. Only a few large vendors get the larger floor space that allows for big displays to get the consumers attention. But consistent with the old saying "Stack it high and watch it fly", these companies pay dearly to have their products in such spaces.

Another concern is that branded vendors have always had to battle with the stores over placement of product competing with the store's Private Label brands. Private Label brands are normally sold for lower prices in the store because most stores usually spend relatively little in marketing the items. But some of the national CPG vendors have significant resources available for marketing and in-store promotion of their competing products, and thus find success even though their products are usually higher in price than the Private Label products.

There is thus a need for a completely new and unique layout for the Center Store area of a retail establishment; one that offers a radical departure from traditional layouts for the Center Store, and one which creates more desirable space for all concerned to promote their products There is also a need for a new and unique layout for the Center Store which, through sale of PrimeZone space to the larger vendors, creates an additional profit center for the store.

There is in addition a need for a novel Center Store solution which adds flexibility to the shelving design so that the store can configure and reconfigure the shelving layout in a PrimeZone space to accommodate the promotional needs of those vendors who are willing to pay a premium for the privilege.

There is yet a further need for a design and layout that offers PrimeZone space for promotional signage within the Center Store which in the past has been limited to off-the-shelf, floor or banners above the aisle signage; such solution providing yet another potential profit center for the store.

Still another need in the field of the present invention is the provision of shelving and other display units mounted on glider devices attached to the supporting leg posts of shelving units and the like, which enable movement, leveling and positional fixation for the units.

BRIEF SUMMARY OF THE INVENTION

The present invention addresses the above stated needs by providing a radically new Center Store design and shelving layout concept which allows selective configuration and reconfiguration of the orientation of certain shelving units and display systems within the central portion of the Center Store; herein referred to as the "PrimeZone", so as to create a new assembly of additional End Caps, novel Center Caps, Power Sets. Triangular Corners, Hot Spots and Banner Boards, the combination of which provides an ideal solution for enabling retailers to re-invigorate their Center Store, increase their vendor promotional revenue, and increase their in-store sales due to more favorable consumer response to greater promotional activity and the periodic change of product venues in key areas of the store layout. In addition, novel display unit supporting hardware is provided which enables the convenient reconfiguration of the shelving layout to accommodate vendors desire to change display schemes.

BRIEF DESCRIPTION OF THE SEVERAL FIGURES OF THE DRAWING

FIGS. 9a and 9b are partially broken axial cross sectional views depicting the assembled glider device of FIG. 8 and illustrating attachment thereof to the lower end of a shelving leg post or the like;

DETAILED DESCRIPTION OF EMBODIMENTS THE INVENTION

Figure 1:
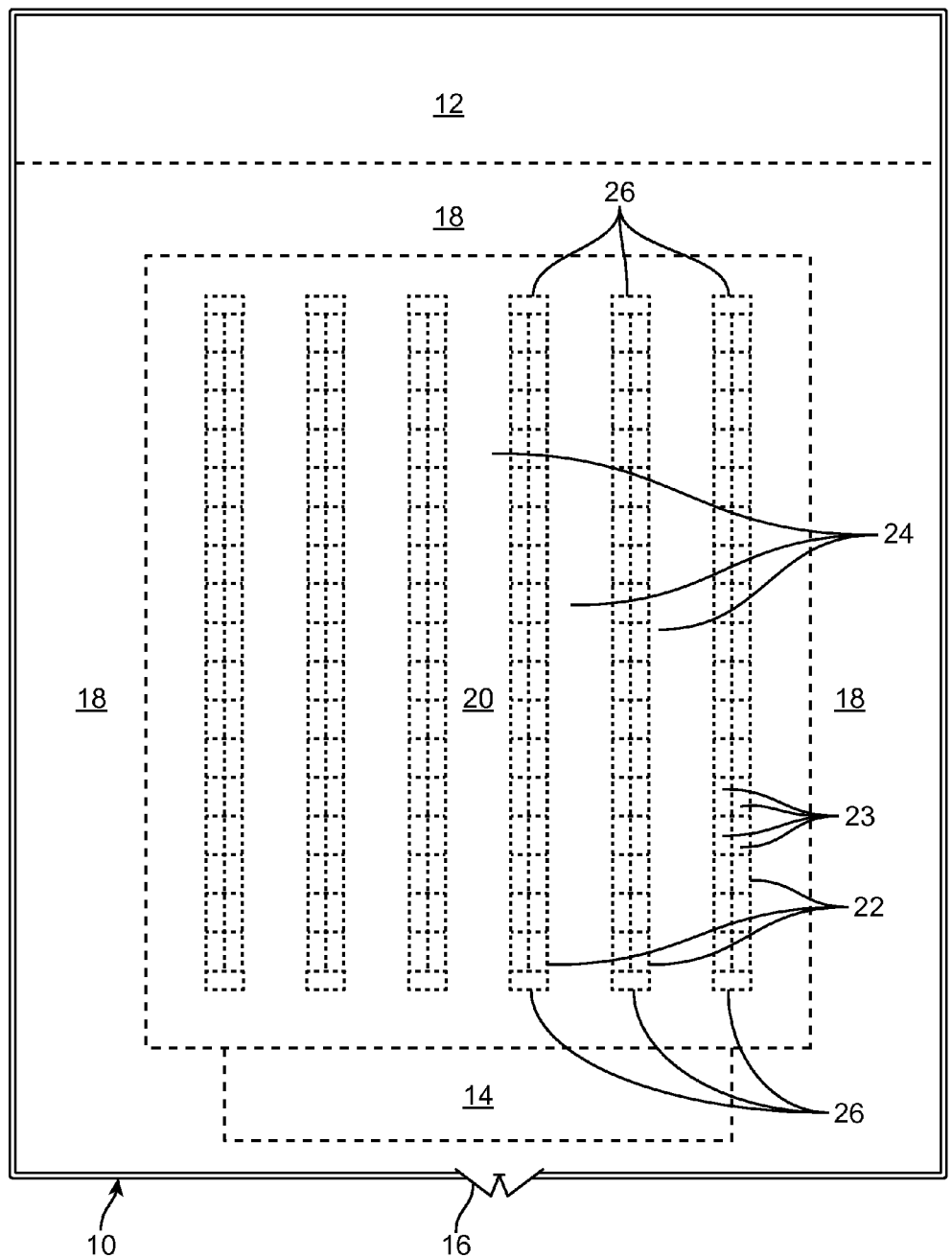
FIG. 1 is a diagram schematically illustrating in plan view a traditional Center Store shelving layout.

As pointed out above, and as illustrated In FIG. 1 of the drawing, the traditional Center Store includes a plurality of long parallel rows of shelves and other product display units defining customer walking aisles formed between the rows of product display units.

Figure 2:
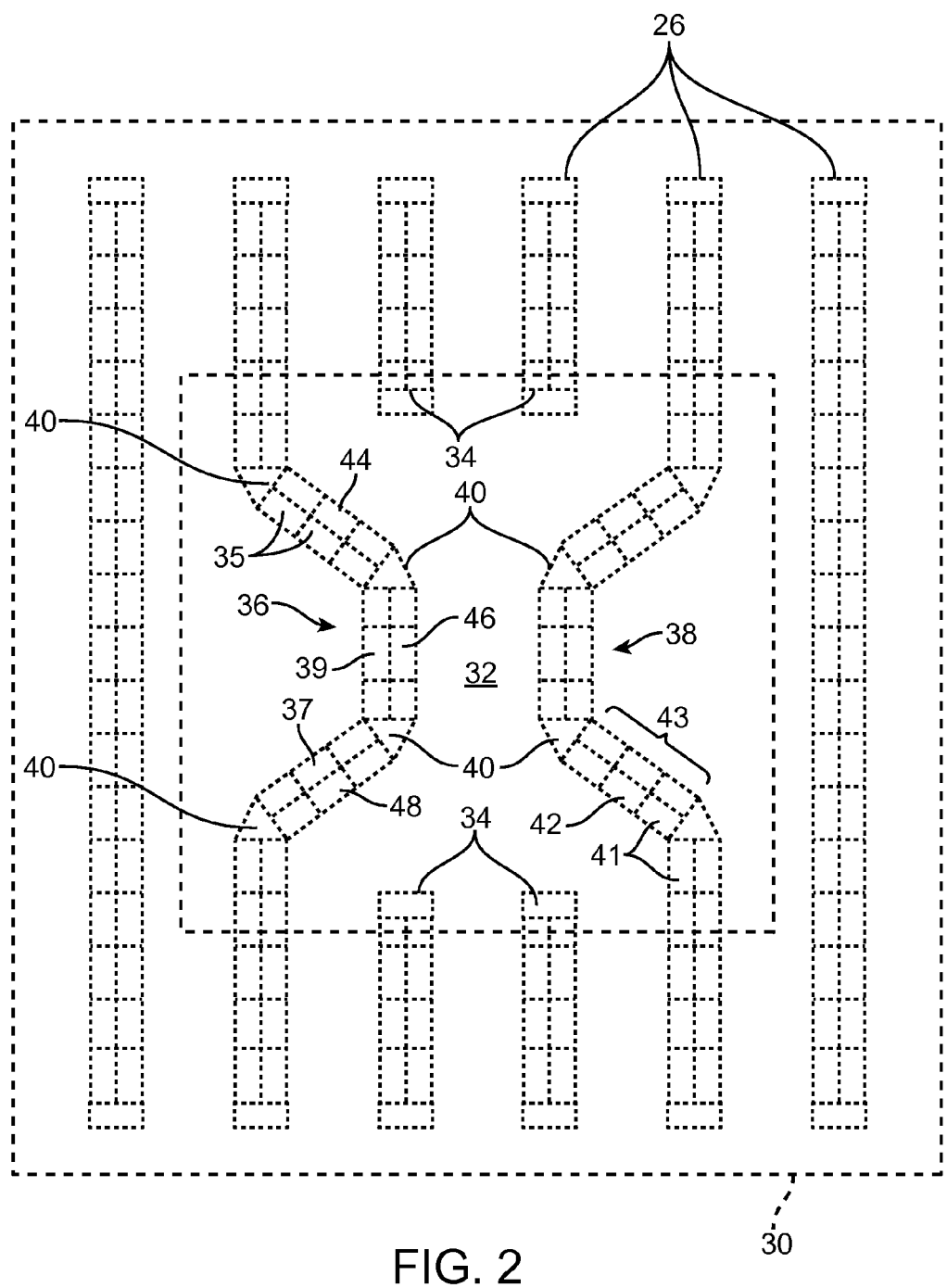
FIG. 2 is a diagram schematically illustrating in simplified plan view a novel Center Store shelving system layout creating a PrimeZone in accordance with an embodiment of the present invention.

In FIG. 2 of the Drawing, a Center Store arrangement 30 is depicted including an embodiment 32 of a PrimeZone in accordance with the present invention. The PrimeZone 32 is an area within the Center Store in which at least some of the gondolas 41 and other product display units may be mobilized by gliders, disclosed below and affixed to the legs or bottoms thereof, so that the units can be selectively positioned and organized in a designed arrangement, fastened together and locked into position until a new design arrangement is desired, at which time the arrangement can be unlocked and reconfigured without substantial inconvenience and/or cost. It will be understood that the PrimeZone is normally intended to be formed in a central portion of the Center Store, but can be expanded to include any portion thereof.

The PrimeZone store layout differs from the traditional Center Store layout in that it offers to CPG (Consumer Packaged Goods) vendors significantly more opportunity to effectively promote their products within the Center Store of a supermarket or other retail establishment. This is accomplished by allowing the store proprietor to work with product vendors to configure arrangements of gondolas (shelving units) and other product display units in ways that enable the vendor to better display and promote its products.

The PrimeZone 32 may be generally described as an area normally within a central portion of the Center Store and having an improved arrangement of product display units and/or systems. The improved arrangement is accomplished by (a) providing breaks in at least a first row and an adjacent second row of the usual plurality of long parallel rows of product display units; (b) providing a first elongated product display unit (or system including a plurality of display units) oriented to have one end thereof disposed in engagement with an end of a display unit or system of the first row adjoining one side of the break in the first row, and having the length thereof extending at a first angle relative to the length of the first row and toward the break in the second row; (c) by providing a second elongated product display unit (or system including a plurality of display units) oriented to have one end thereof disposed in engagement with another display unit or system of the first row adjoining the other side of the break in the first row, and having the length thereof extending at a second angle relative to the length of the first row and toward the break in the second row; and (d) by providing means joining the other ends of the first and second elongated display units (or systems) to form a first alcove-like Power Set area within and around which to display products. The joining means can include a simple connection mechanism, a single product display unit or an elongated, multiple unit product display system.

In addition, and as will be further discussed below, because of the unique configurability of the aisles and the flexibility of use of the shelving systems of the present invention, the PrimeZone design concept offers the opportunity to create an abundance of promotional areas and features including the availability of additional End Caps 34, Center Caps (described below), Power Set areas 36 and 38, Triangular Corner units and Corner Boards 40 (described below), Banner Boards (described below), and Hot Spots (described below).

The new configuration and flexibility of the display units and aisle configurations, as defined in part by the angled positions of the several movable shelving systems, allows the provision of additional End Caps in the PrimeZone as depicted at 34. The End Caps 34 are typically 3 to 4 feet in width, 21 inches in depth and 7 feet high. An End Cap can be a shelving unit with multiple shelves, a platform that allows the retailer to stack cases of product at the end of a row of shelving units, or a cooler/freezer unit, for example. End Caps are typically provided at both ends of an aisle-defining shelving assembly (see 26, 34), and are used primarily for promotional purposes, but sometimes include a refrigeration unit offering cold drinks, refrigerated foods and/or other types of food products.

One of the advantages of a PrimeZone product display configuration, such as that depicted in FIG. 2, is the ability to focus the consumers view on particular products or groups of products as they enter and proceed along an aisle. Instead of merely having only the open remote end of the aisle in their direct view, as in the traditional linear parallel aisles configuration depicted in FIG. 1, the PrimeZone design positions angled shelving units or other product display units 42, herein referred to as Center Caps, to at least generally face customers as they enter an aisle.

Center Caps 42 consist of the one or more product display gondolas 41 or other product display units that form part of the systems 43 (shown by dashed lines as an assembly of six rectangles 42 in FIG. 2) that are, in accordance with the present invention, positioned in angular relationship relative to the traditional row of aisle-shelving to which they are joined. Thus, as a customer starts walking down the aisle across which the Center Cap shelving angularly extends, he/she will be able to clearly see product and promotional materials that are displayed in, on and around the Center Cap unit.

Depending on the size of the store, and as depicted in the examples shown in FIGS. 12-17, there can be multiple product display units angling across an aisle from one traditional row of shelving and extending toward or into and perhaps through a break in an adjacent row of shelving that would otherwise define a long straight aisle of a traditional store layout. An angular relationship (usually of about 60 degrees) of Center Cap systems 43 to a traditional row is offered herein as an example, but it is to be understood that the actual angle of shelving intersection to be chosen for a particular application can be virtually any angle suited to the promotional activity and products to be promoted or displayed. Center Cap systems are typically 4 to 16 feet in length (including one to four pairs of 48" product display gondolas, coolers, etc.) depending on the size of the store and the promotional activity; but they can of course be made larger or smaller.

Figure 2A:
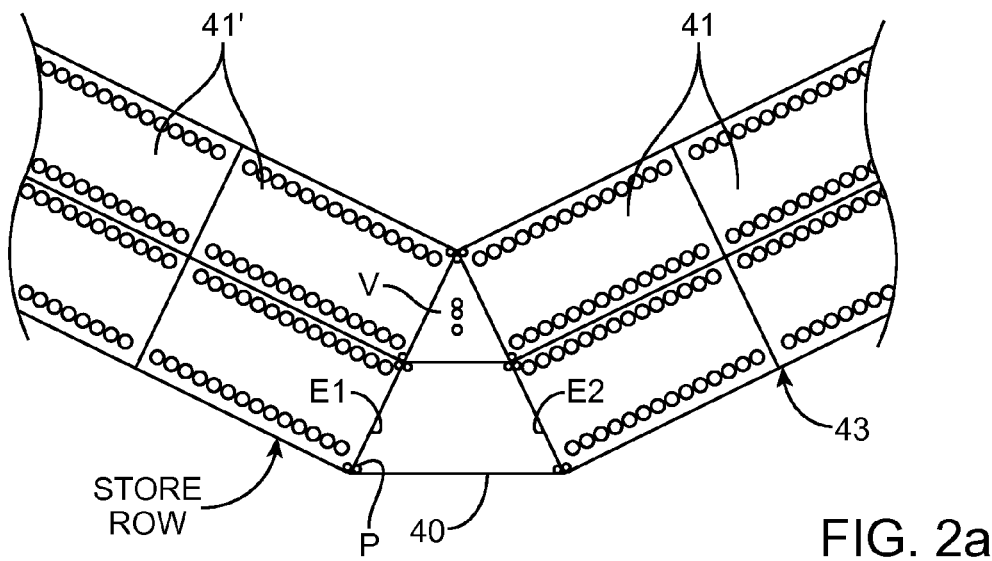
FIGS. 2a-2g are plan and elevational views illustrating the angled intersection of shelving units in a PrimeZone shelving system in accordance with the present invention.
Figure 2B:
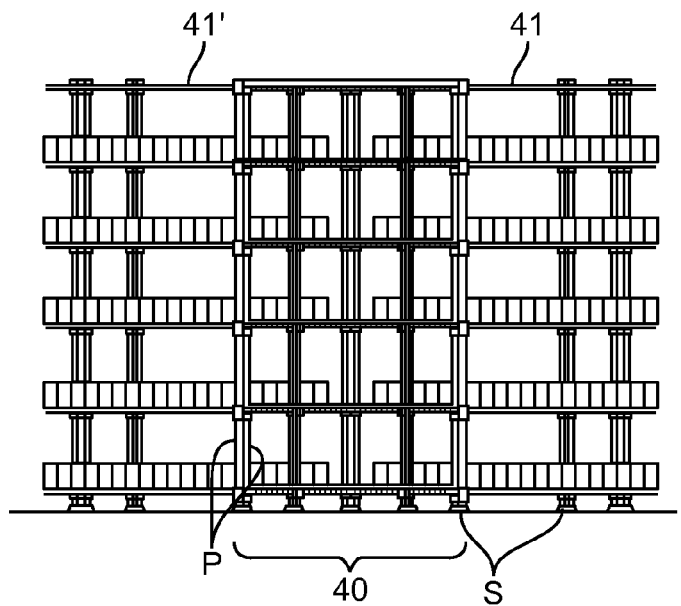
Figure 2C:
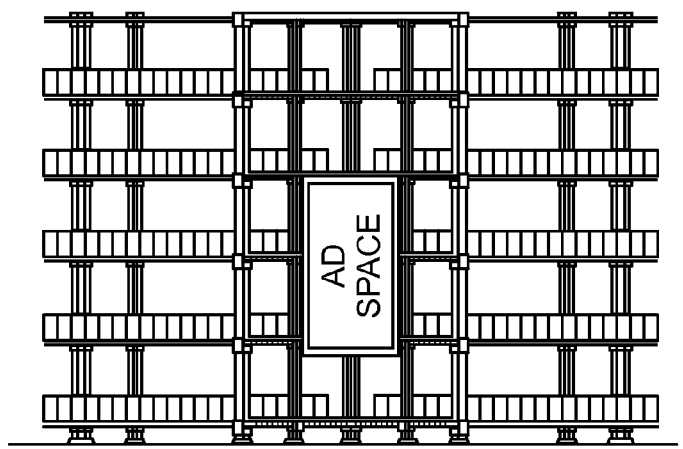

As depicted in the plan and elevational views of FIGS. 2a-2c, the angled intersection of the ends E1 and E2 (FIG. 2a) of a shelving system 43 (formed by a plurality of longitudinally aligned product display units 41) with a traditional store row of display units 41' presents a triangular opening or cell within which a Triangular or Trapezoidal Corner unit 40 can be installed. In the illustrated example, the Corner unit 40 is of a trapezoidal configuration including four vertical posts P and associated shelving typically disposed at levels corresponding to the associated adjacent shelving units. In such case a triangular void "V" might be left in the space immediately there behind or it might include additional shelving. Alternatively, a five post Triangular Corner unit such as that illustrated in FIG. 2g could be used.

As will be described below, a plurality of clamps or other suitable fasteners are used to fasten the Corner unit to the posts of the several adjacent product display units. Furthermore, as will also be described below, vertically adjustable glider devices and positional tie-down brackets may be affixed to the lower ends of the vertical posts P to facilitate movement, leveling and tie-down of the gondolas.

Figure 2D:
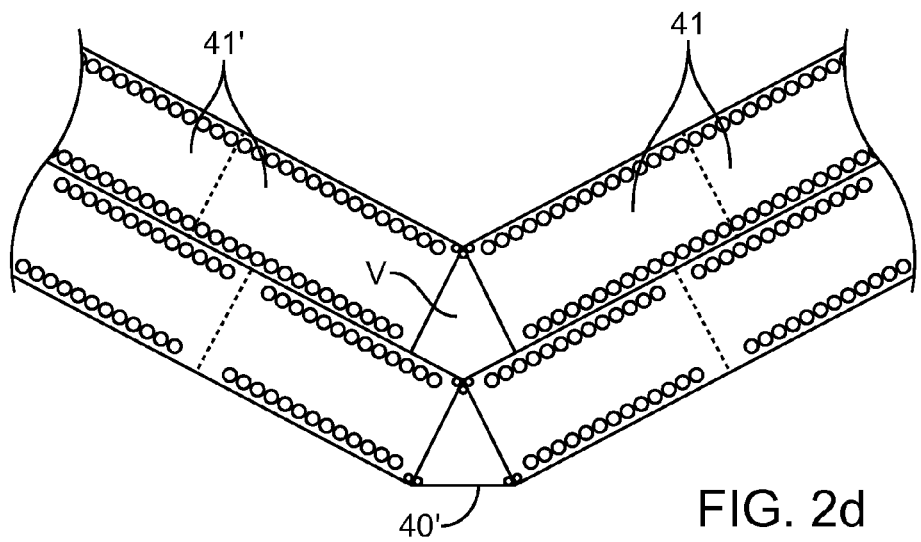
Figure 2E:
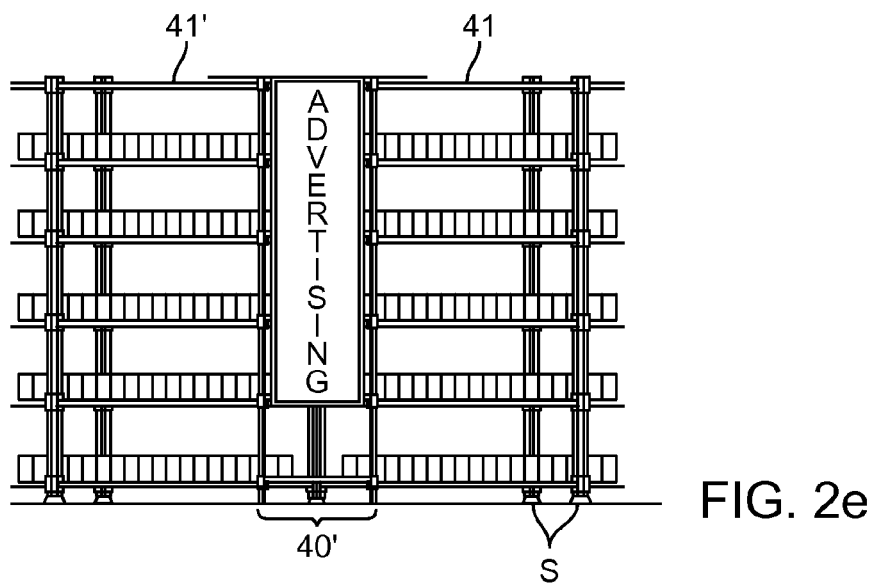
Figure 2F:
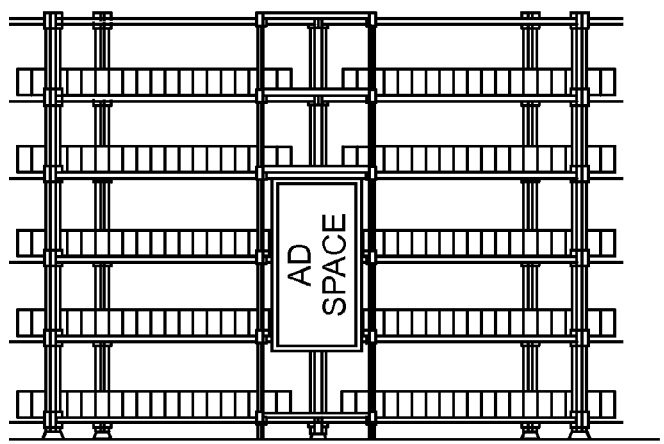

It will be noted that in addition to providing extra shelf space, the Triangular Corners units can also serve as supports for promotional signage, as depicted in FIGS. 2c, 2e and 2f, or other marketing devices such as video screens, sound equipment, promotional literature, coupon dispensors, etc.

In FIGS. 2d-2e an alternative embodiment of a smaller Triangular Corner unit 40' is similarly illustrated for use in the case where the several front and back shelving units are longitudinally staggered relative to each other. In such configuration, the Triangular Corner unit 40' is smaller in frontal dimension than in the previously described embodiment but is functionally similar. This arrangement likewise provides a display opportunity for shelf space and promotional signage, objects and materials.

Figure 2G:
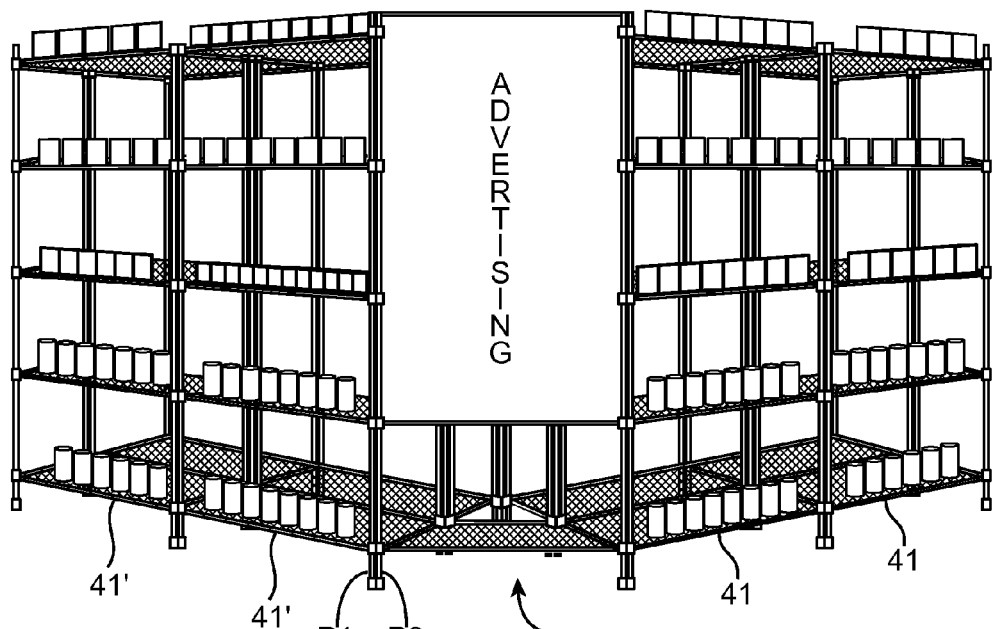

FIG. 2g is a perspective view further illustrating the Triangular Corner unit embodiment of FIGS. 2a-2c, and by extension, the embodiment of FIGS. 2d-2f. The Corner units may include one or more shelves or frames for supporting advertising display boards (Corner Boards) or posters. The Corner units may also include flat panel video display means to permit animated product display, product use demonstrations and consumer interactive information panels or the like.

Figure 2H:
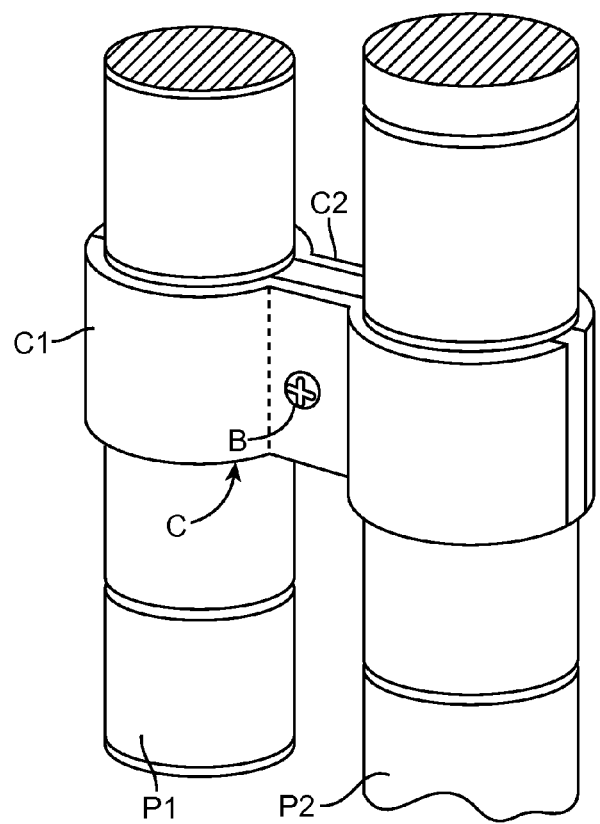

FIG. 2h depicts two vertical support posts P1 and P2 of the type used in many commercially available shelving units, and a clamping style fastening device C used to fasten the two posts together. The device C can take many forms but the illustrated two part clamp consisting of front and back members C1 and C2 secured together by a suitable screw or bolt B is considered ideal for the present application, because when attached to only one set of adjacent shelving unit corner posts, it allows one of the units (or sets of units) to be rotated in position relative to the others to assume a different angle of intersection between contiguous shelving systems.

As depicted in FIG. 2, the three sided Power Set areas 36 and 38 are formed by the illustrated two sets of shelving systems (including Power Set units 35 and 37, and Center Cap units 44 and 48) angling toward and joined to a third shelving system (including Power Set units 39 and Center Cap units 46) that is disposed to extend parallel to an adjacent aisle on the other side of the third row of shelving units. The Power Set/Center Cap shelving systems can have any of a variety of configurations and can be located anywhere along the length of an aisle, but are usually positioned near the middle of a Center Store and help to define the PrimeZone 32. Other examples are depicted below in FIGS. 12-17 of the drawing.

Power Sets create a significant billboard effect partially surrounding and defining the Power Set areas (36, 38) and can be advantageously used to the benefit of a CPG vendor. The ability to effectively promote, within a relatively small common area, several brands or related products owned by or represented by the vendor provides a powerful promotional advantage. The brands marketed within the Power Set area might, for example, include refrigerated products as well as frozen and shelf stable products. Power Sets also allow the vender to display products within the surrounding aisle space in either free standing form or other specific configuration, and to display promotional materials/information on the area-framing pair of Corner units 40.

The underlying advantageous marketing concept is that a consumer will be drawn into a Power Set area due to its configuration, and because it represents a "section" of promotional activity. A Power Set can include display frontage as long as 24 feet or so in length including, for example, nine four foot product display sections framed by Corner Boards, but the configuration can be of almost any size, composition and configuration.

Triangular Corner units 40 of the type illustrated do not currently exist in the traditional Center Store areas because the typical shelving system layout is one of linear parallel rows of display units. Moreover, Triangular Corners exist in PrimeZone areas as a consequence of the unique relative positioning of the several shelving systems used to define the PrimeZone. The Triangular Corner units provide great opportunities for Corner Board advertising, sampling, couponing, or a combination of all the three, as well as other possibilities mentioned above.

In addition to the angle of intersection of the product display units, the front width of the Corner unit is determined by whether the front and back rows of shelving units are longitudinally aligned or staggered relative to each other. As pointed out above with respect to FIGS. 2a-2c which illustrate the aligned gondola example, and FIGS. 2d-2f which depict the staggered gondola configuration, the Triangular Corner units are typically 22" to 44" at the front and reduce to substantially zero inches at the rear as both sides thereof converge on the corner junctions of the adjacent shelving units.

Hot Spots are focal point areas (see 50 and 52 in FIG. 7) within the Power Set areas and other open areas and are so called because of the strong response of consumers to displays that are interruptive, large and stacked high. There is a saying in the industry to the effect that if you "Stack it high, it will fly". Traditional positionings of floor stacks are typically found in the perimeter of the store and at aisle ends, but never in Center Store as there is no place in an aisle for such displays. If such displays were used in the current shelving schemes, they would block the aisles and interfere with the customers' use of the aisles. However, in the PrimeZone configuration, Hot Spots do not block an aisle, but do cause the consumer to take notice to a floor stack of products, a manufactured display promoting one or more brands of products, and the products displayed on the surrounding shelves. Hot Spots can be a little as 2 feet square or much larger depending on the size of the Power Set area. The height of a Hot Spot is based on the particular product and/or display, but typically would be 4 feet to 8 feet high. Hot Spot units can also be used in other areas as described below with respect to FIGS. 4, 6 and 7.

Figure 3:
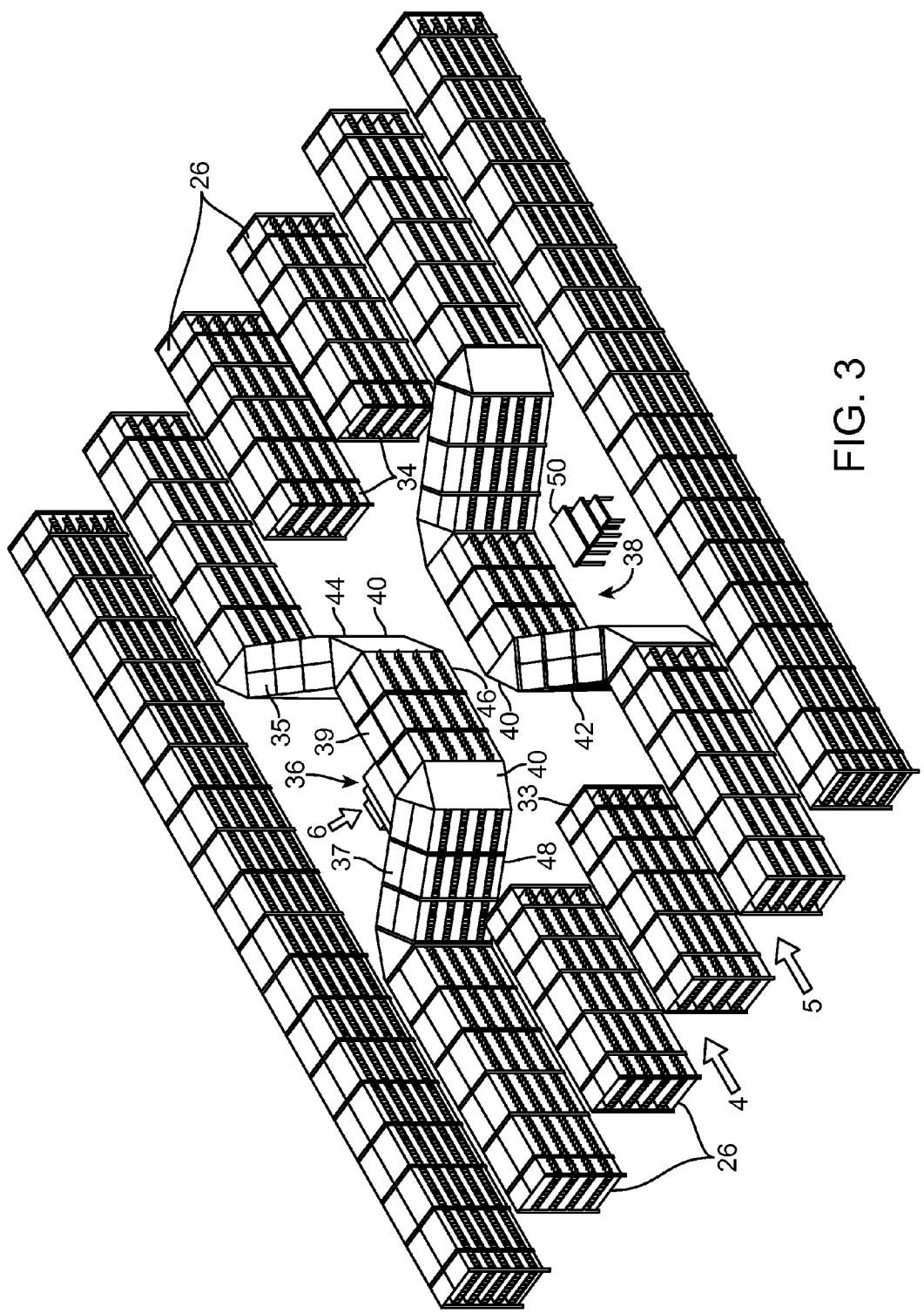
FIG. 3 is a perspective view further illustrating the improved Center Store including a PrimeZone in accordance with the embodiment of the present invention generally shown in FIG. 2.
Figure 4:
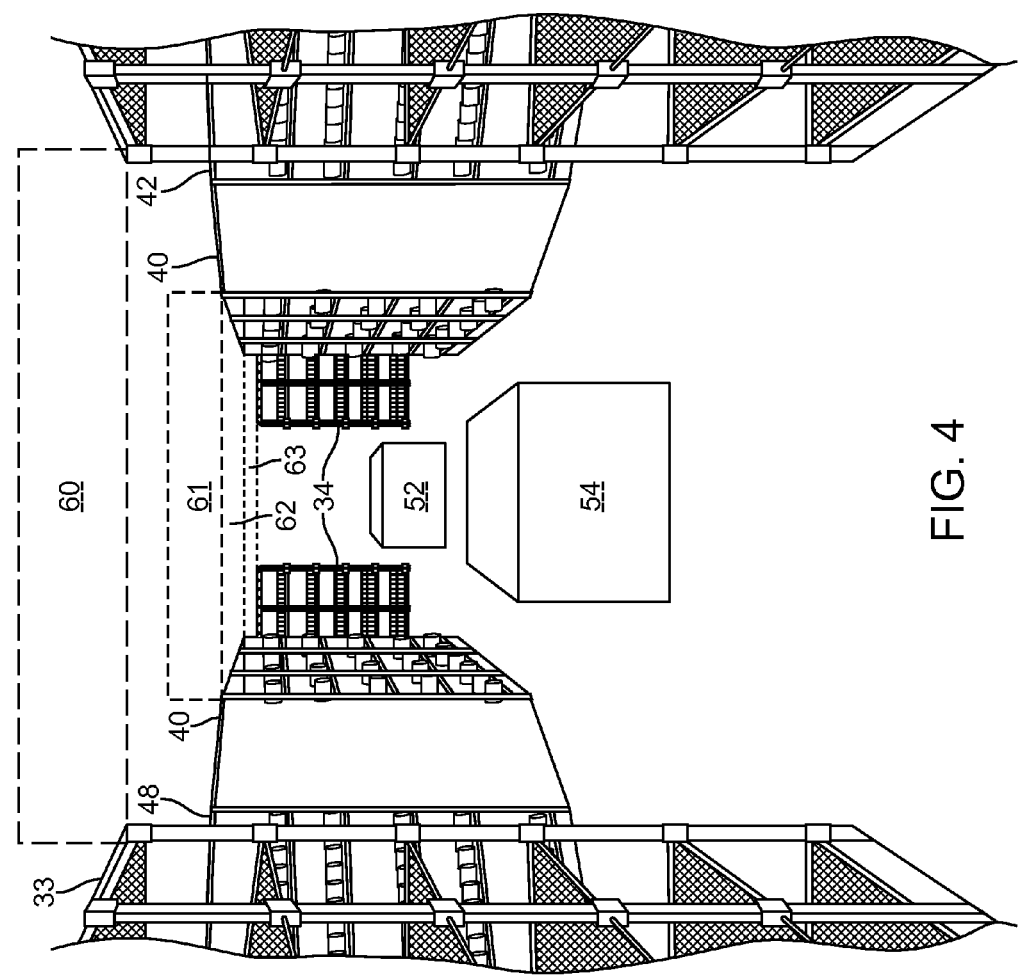
FIG. 4 is a perspective view illustrating that which a consumer would see standing at a position 4 as depicted in FIG. 3 and looking in the direction of the associated arrow.

Turning now to FIGS. 3-6, perspective renderings are provided to present the actual look and feel of one embodiment of the present invention. In the overhead view of FIG. 3, the reader can readily identify and appreciate the details of the various components previously described with respect to the plan view of FIG. 2. The various elements and areas of this embodiment are labeled with the same call-out numbers used in FIG. 2. In FIG. 3, Hot Spot units within the Power Set areas 36 and 38 are, for simplicity, depicted as stacks of nested tables but can take any suitable form as pointed out above. Again for simplicity of illustration, the Hot Spots 52 and 54 illustrated in FIGS. 4 and 7 are not depicted in FIG. 3. Also not shown in FIG. 3, are the advantageous locations for placement and display of Banner Boards (60-63 in FIG. 4).

FIG. 4 is a lower level view of the PowerZone components that would occupy the visual attention of a customer entering the aisle and looking in the direction of arrow 4 (FIG. 3). Note that the customer's attention will be quickly captured by promotional messages or products displayed on the remotely positioned End Caps 34 and the Triangular Corner units 40. Products displayed on the Center Caps 42 and 48 would then come into full view as he passes along the aisle and through the nearby End Caps 33 on both sides of the aisle. This figure also illustrates 2 Hot Spot units 52 and 54 which are not shown in FIG. 2 or 3 but which can be positioned in the open spaces formed between the End Caps 33, 34 and the respective pairs of Triangular Corner units 40 as also depicted in FIG. 7. In addition, this view illustrates in dashed lines several positions for placement of the overhead Banner Boards 60-63.

Figure 5:
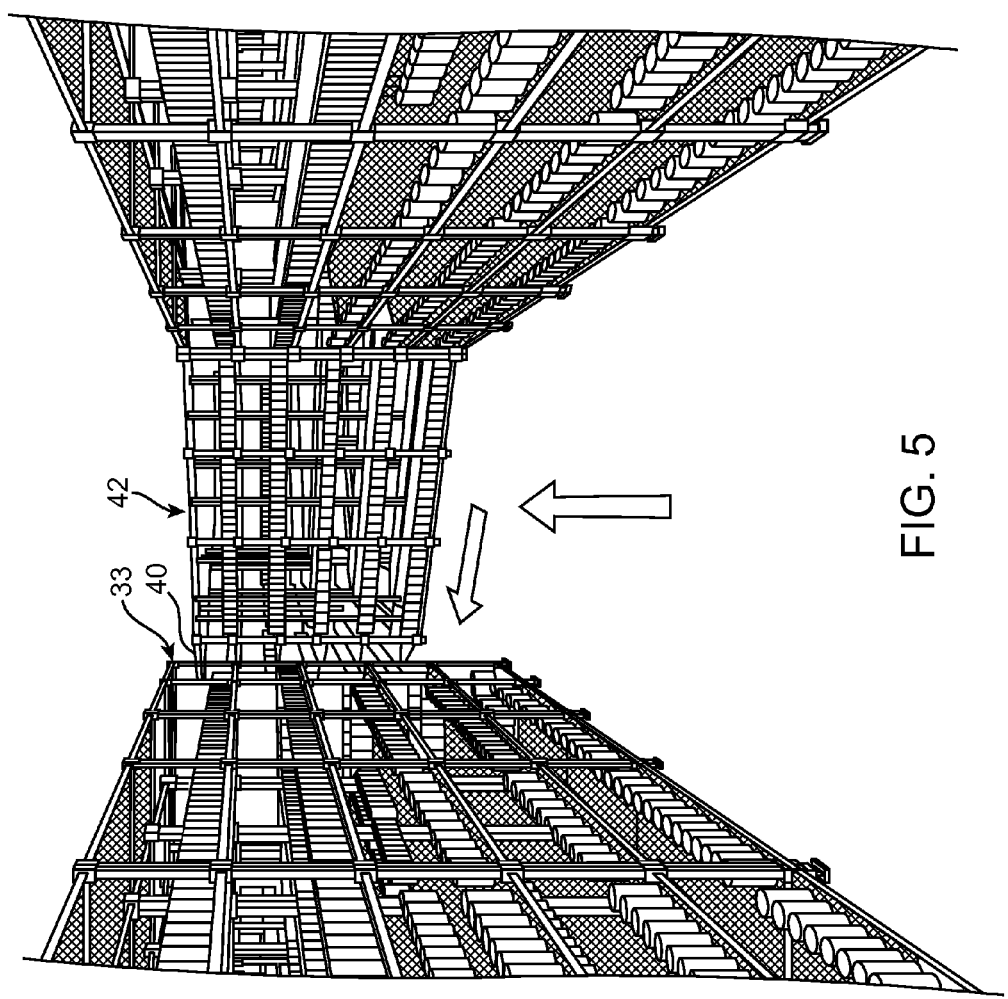
FIG. 5 is a perspective view illustrating that which a consumer would see standing at a position 5 as depicted in FIG. 3 and looking in the direction of the associated arrow.

FIG. 5 is a lower level perspective view looking in the direction of the arrow 5 in FIG. 3 and showing the clear visibility of the Center Cap 42, and then the Corner unit 40 as the customer reaches the turn in the aisle.

Figure 6:
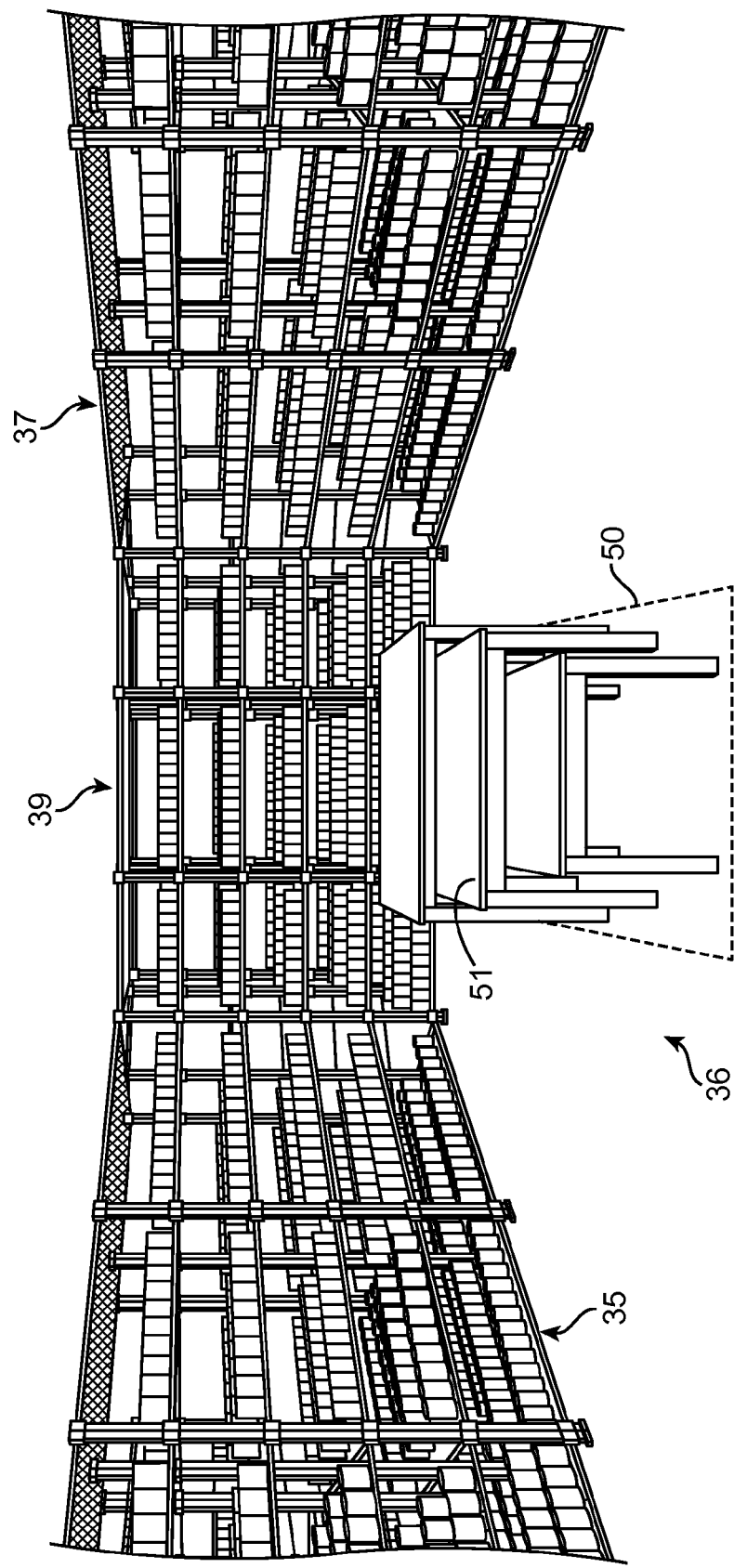
FIG. 6 is a perspective view illustrating that which a consumer would see standing at a position 6 as depicted in FIG. 3 and looking in the direction of the associated arrow.
Figure 7:
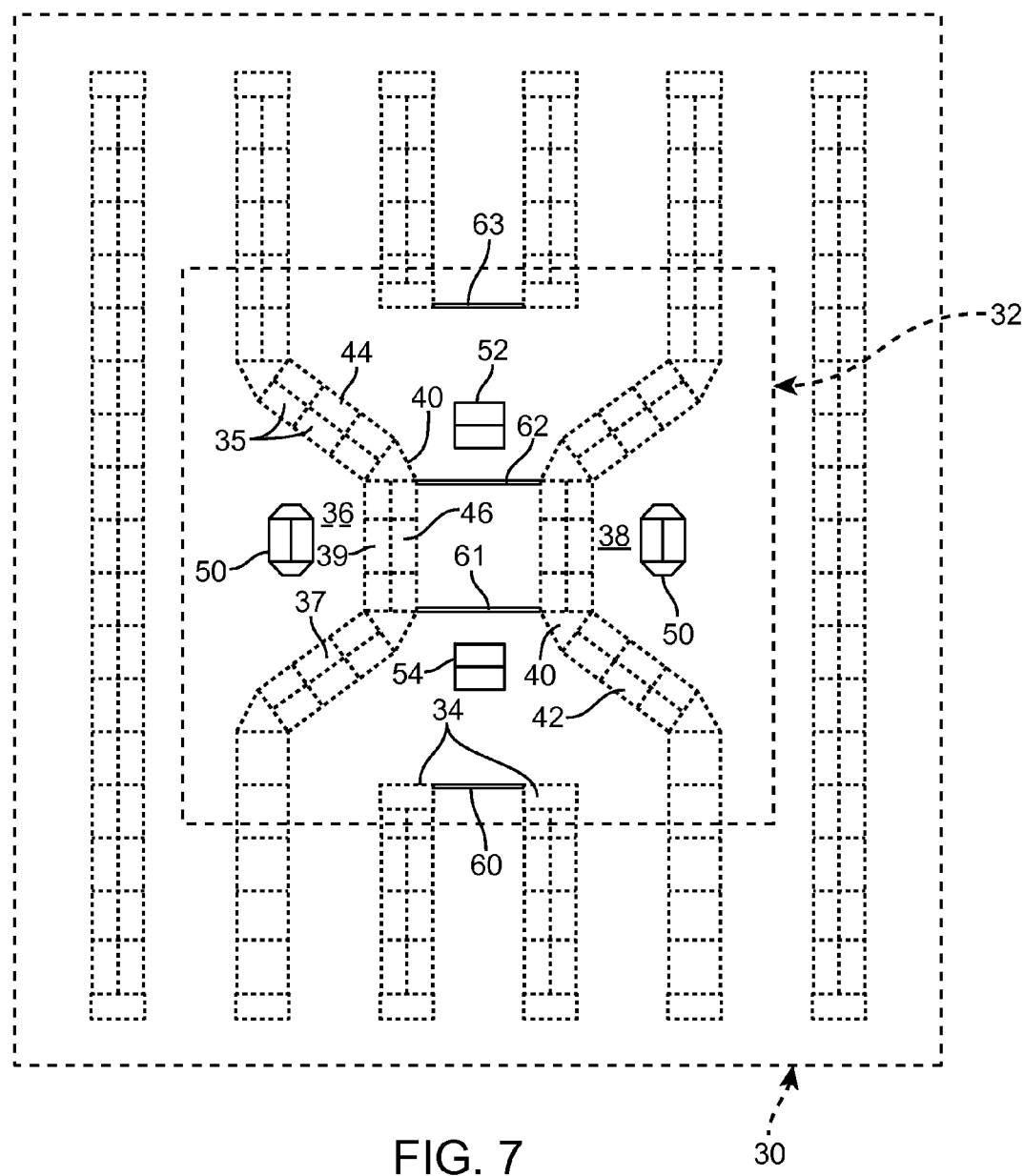
FIG. 7 is a diagram schematically illustrating in plan view further details of the previously illustrated embodiment of a PrimeZone in accordance with the present invention.

FIG. 6 is a lower level perspective view looking in the direction of the arrow 6 in FIG. 3 and showing the Power Set area 36, the Hot Spot area 50 and the clear visibility of the surrounding shelving systems 35, 37 and 39. It should be kept in mind that any or all of the illustrated shelving systems could instead include refrigeration cabinets or other forms of product display units. Note also that the nested tables 51 occupying the Hot Spot area 50 could alternatively be replaced by any product stack or product display structure.

FIG. 7 is a summarizing plan view similar to that of FIG. 2 but including representations of all of the PrimeZone components illustrated and discussed above with respect to FIGS. 2-6.

A PrimeZone in accordance with one embodiment of the present invention may be constructed of either proprietary or commercially available shelving units. Current state of the art shelving suitable for use in embodiments of the present invention are typically fabricated of welded stainless steel rod and tubular stock. Although such shelving units are available with casters, the casters utilized are not deemed suitable for the present application because of the large caster wheel size.

To render non-wheeled shelving units movable among various design configurations it is desirable that low profile glider devices be provided for attachment to the legs of the display units. Preferably, the glider devices should have a low profile so as to permit maximum use of the available shelf space, must be easily attachable to the shelving, must have a relatively broad footprint so as to avoid damaging the supporting floor, must be adjustable in height to accommodate leveling, and must be durable and capable of supporting the expected heavy product loads. In addition, at least some of the glider devices must include means for securing the shelving units to the supporting floor.

Figure 9A:
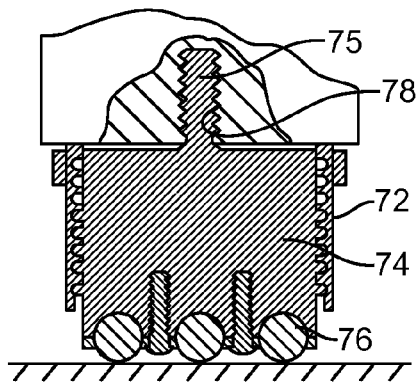
Figure 9B:
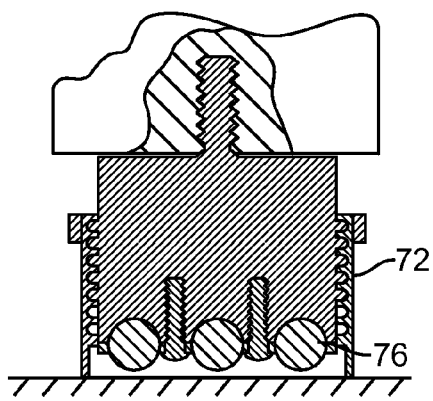
Figure 8:
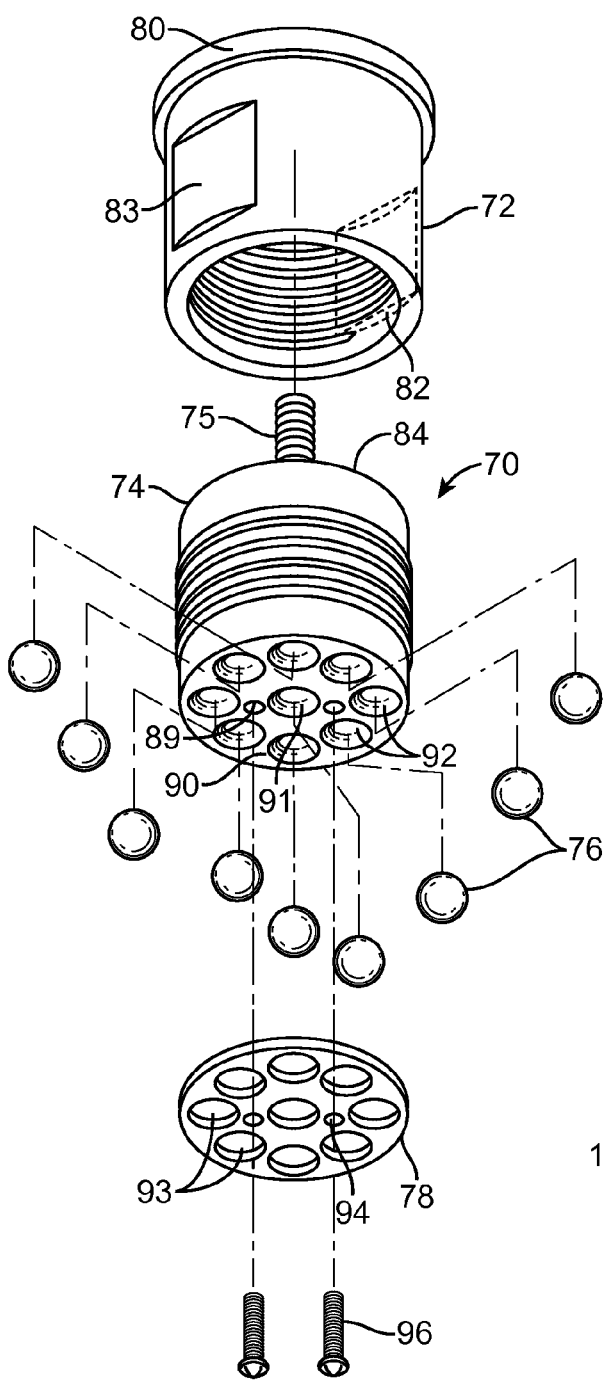
FIG. 8 is an exploded view showing the component parts of a novel glider device for attachment to the legs of shelving units and other product display systems to enable leveling and movement from one position to another in accordance with the present invention.
Figure 10:
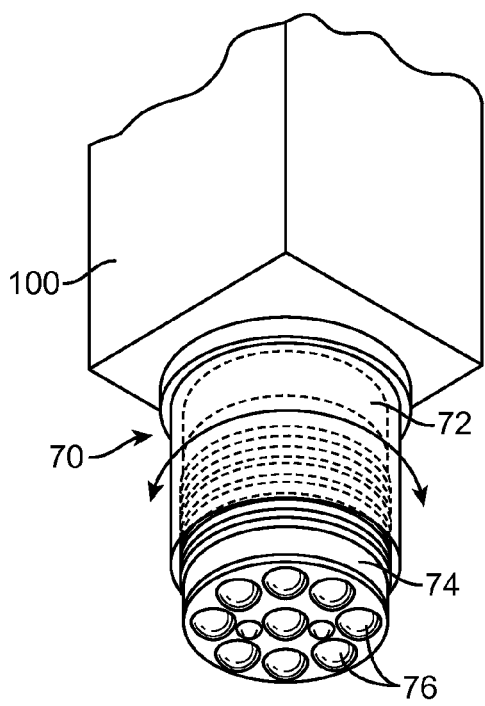
FIG. 10 is a simplified perspective view showing the glider device of FIG. 8 affixed to the lower end of a shelving leg or the like in accordance with the present invention.

A new design for a glider device is illustrated in the exploded view of FIG. 8, the axial cross sections of FIGS. 9a and 9b, and the perspective view of FIG. 10. More specifically, the illustrated glider device 70 is comprised of four basic components; namely, a cylindrical outer housing 72, a roller carrying plug-like component 74, a plurality of roller balls 76 and an apertured, ball capture plate 78.

In the illustrated embodiment, the outer housing 72 is comprised of a generally cylindrical sleeve-like unit having an internally threaded bore 82 extending axially therethrough, and a knurled or otherwise textured band 80 press fit around its upper end to strengthen that end and facilitate manual rotation thereof about the plug 74. The outer surface may be provided with tool engageable flats 83 to facilitate vertical adjustment (leveling).

The plug-like component 74 preferably consists of a metal cylinder 84 having external threads 86 formed on its outer cylindrical surface along at least a mid-portion of its axial length; such threads being adapted to be threadably engaged by the internal threads 82 in the bore of sleeve 72. The axial length of plug 74 is preferably longer than the axial length of the sleeve 72. Extending from the upper end of plug 74 is a threaded stud 75 for use in attaching the device to the lower end of a display unit leg. As an alternative for use with those shelving units having tubular legs, an upwardly extending cylindrical bore, perhaps internally threaded, may be provided in in the top of a lengthened plug for matingly engaging a foot end of a shelving unit vertical post.

The lower end surface 90 of plug 74 is planar except for having a plurality of hemispherical bores, molded cavities or sockets 92 provided therein in a circular array, and may include a single, like bore, cavity or socket 91 provided in the geometrical center of the array. The diameters of the hemispherical sockets are chosen to be matingly commensurate with the diameter of a plurality of roller balls 76 to be seated therein. A pair of tapped bores 89 are also provided in the end surface 90.

The ball capture plate 78 is provided with a plurality of frusto-conical or frusto-hemispherical apertures 93 axially aligned with the sockets 91, 92. Plate 78 also includes at least two small bores 94 for receiving screws or bolts 96 used to lockingly engage tapped bores 89 and secure the plate to the lower end of plug 74 to capture the balls 76 within the respective sockets but allow the lower portions of the balls to extend through the apertures 93 to engage a supporting surface.

Referring now to FIGS. 9a, 9b and 10, the assembly of the glider device and its mounting to the end of a leg or post of cylindrical or rectangular transverse cross section will be addressed. As depicted in FIGS. 9a and 9b, after the bearing balls 76 are positioned within the sockets 92 and captured therein by the apertured plate 78 and its screws 96, the assembled plug is affixed to the lower end of the shelf supporting post 100 by screwing the stud 75 into a tapped bore 98. The sleeve 92 is then threaded onto the plug 74 until the roller balls 76 are clear. At this point the glider device is fully functional to glidingly support the leg of the display unit.

As illustrated in FIG. 9b, those skilled in the art will appreciate that by rotating the sleeve 72 in a particular direction about the plug 74, the engagement of threads 82 and 86 will cause the sleeve to advance downwardly into engagement with the floor and result in the balls 76 to be lifted from engagement with the floor. Such action will negate the gliding function and may also be useful in lifting the leg to level the supported shelving unit.

It will also be understood by those of skill in the art that with glider devices of the type described above secured to the legs of a shelving unit, the unit may by conveniently moved from one position to another as the balls 76 roll within their sockets. Moreover, in order to level the legs on an uneven supporting surface, the sleeves may be rotated to drive them down the plug 74 and thus accomplish the leveling function.

Figure 11A:
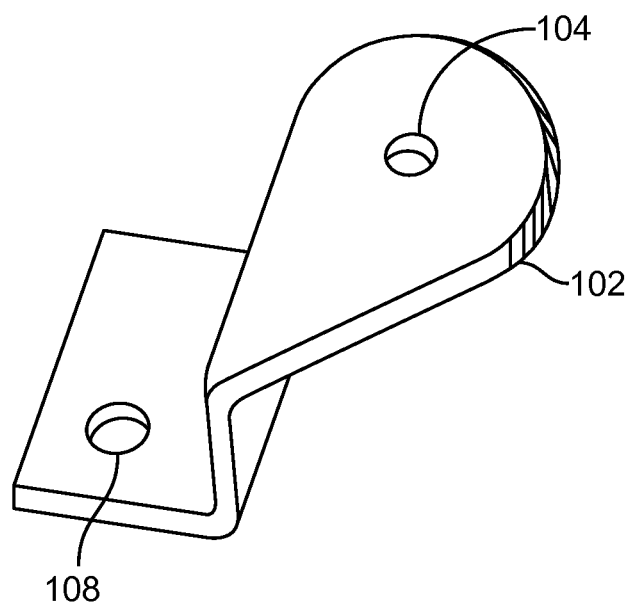
FIGS. 11a and 11b are perspective and cross-sectional views illustrating a positional locking bracket for use with a glider device in accordance with the present invention.
Figure 11B:
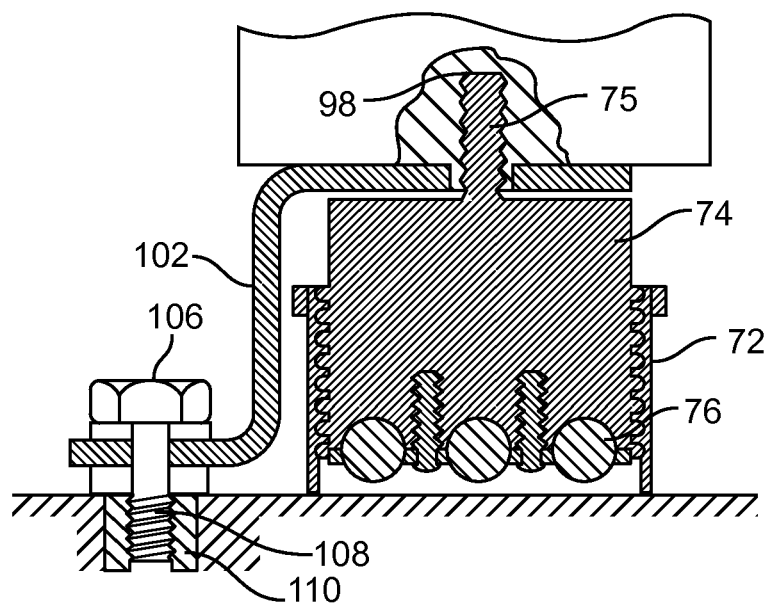
Figure 12:
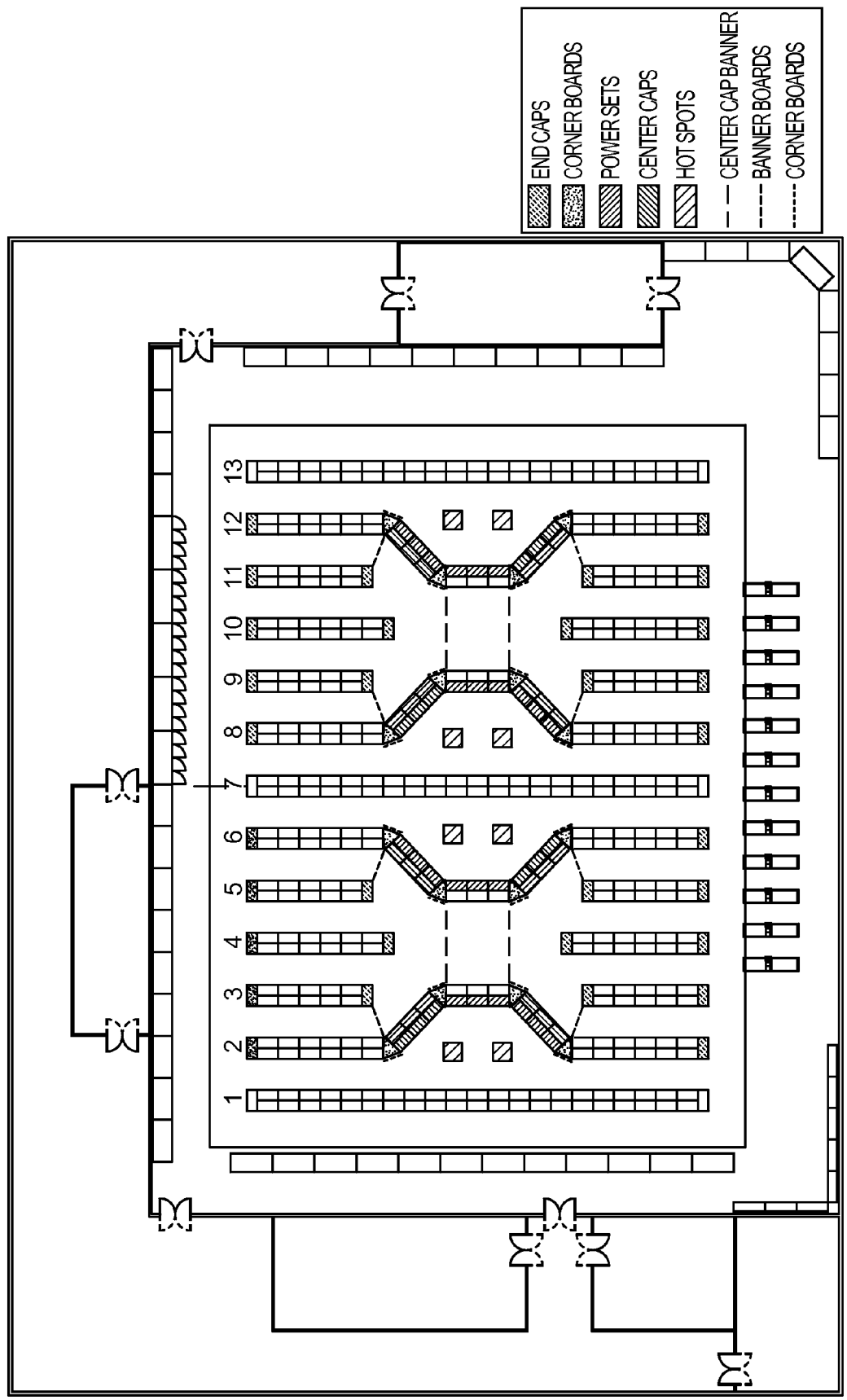
FIGS. 12-17 are diagrams schematically illustrating in plan view several alternative embodiments of PrimeZones in accordance with the present invention.
Figure 13:
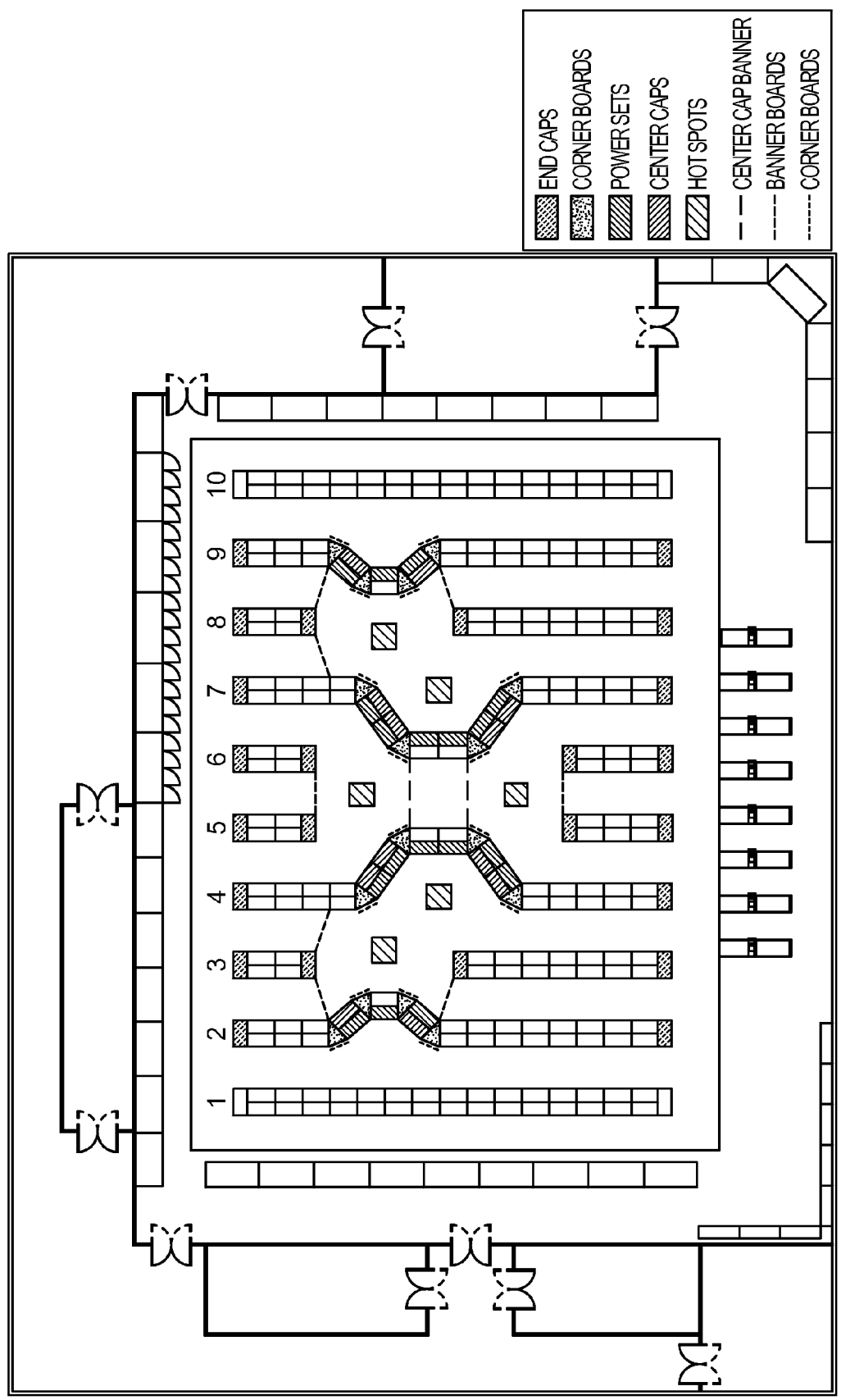
Figure 14:
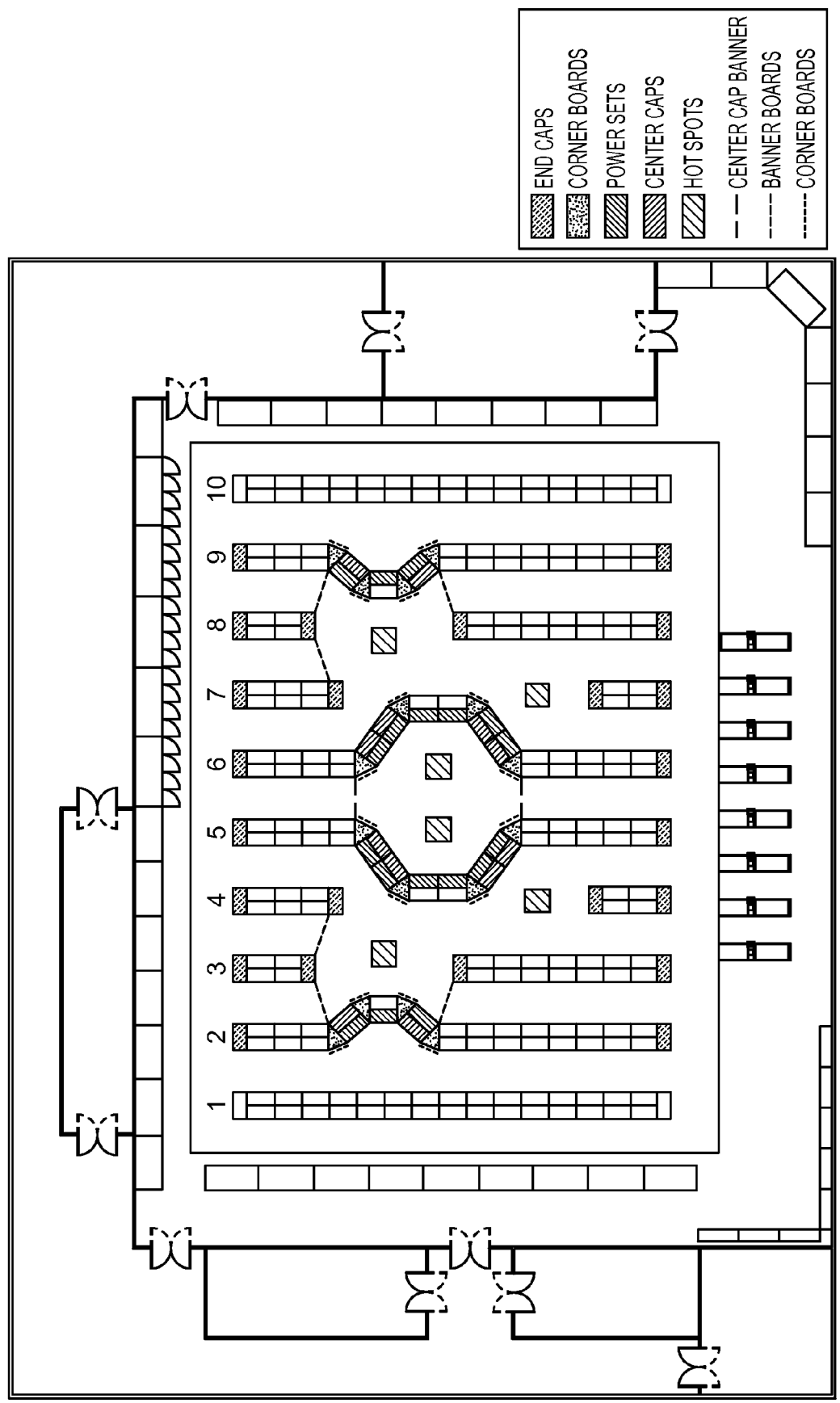
Figure 15:
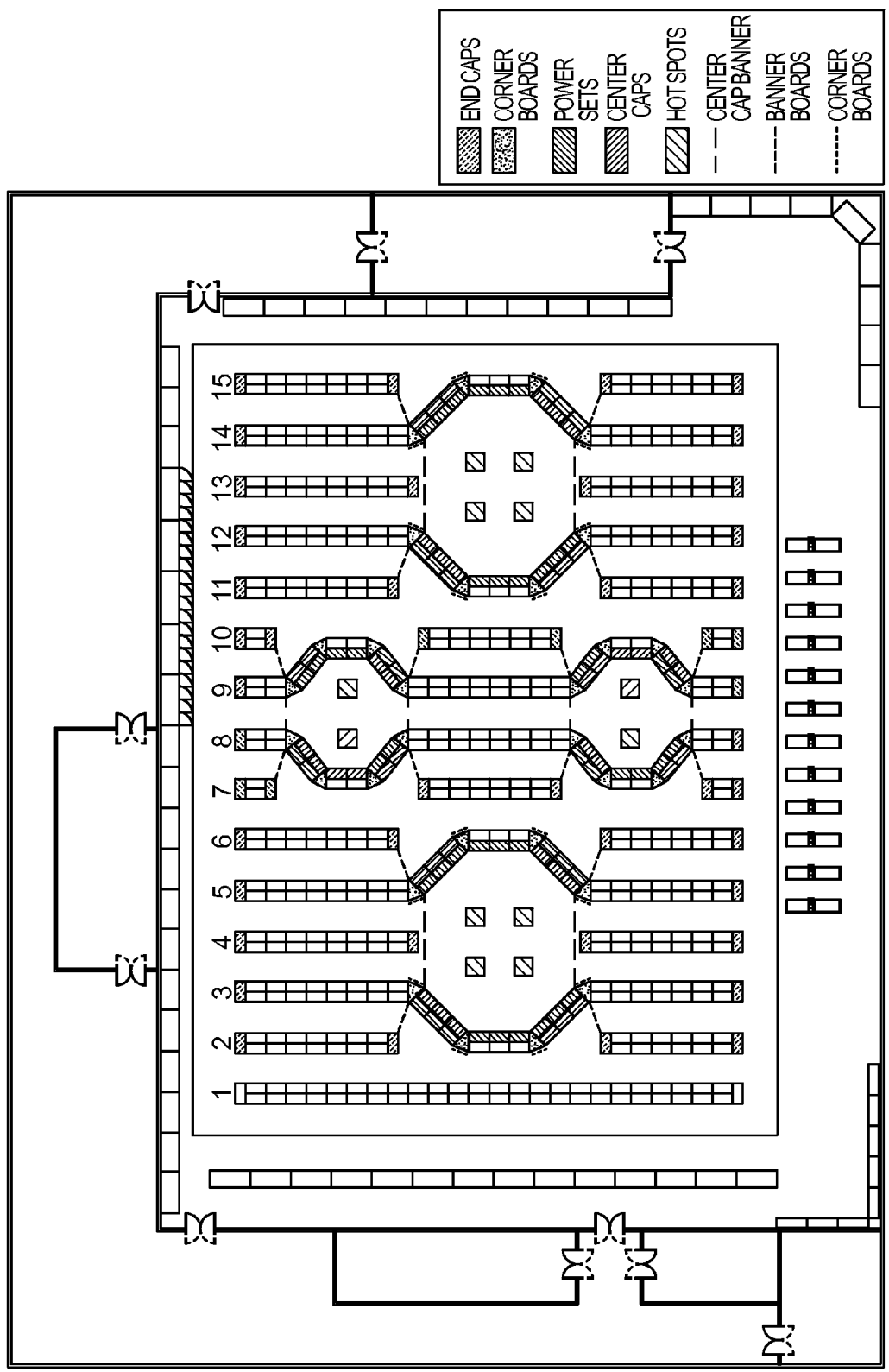
Figure 16:
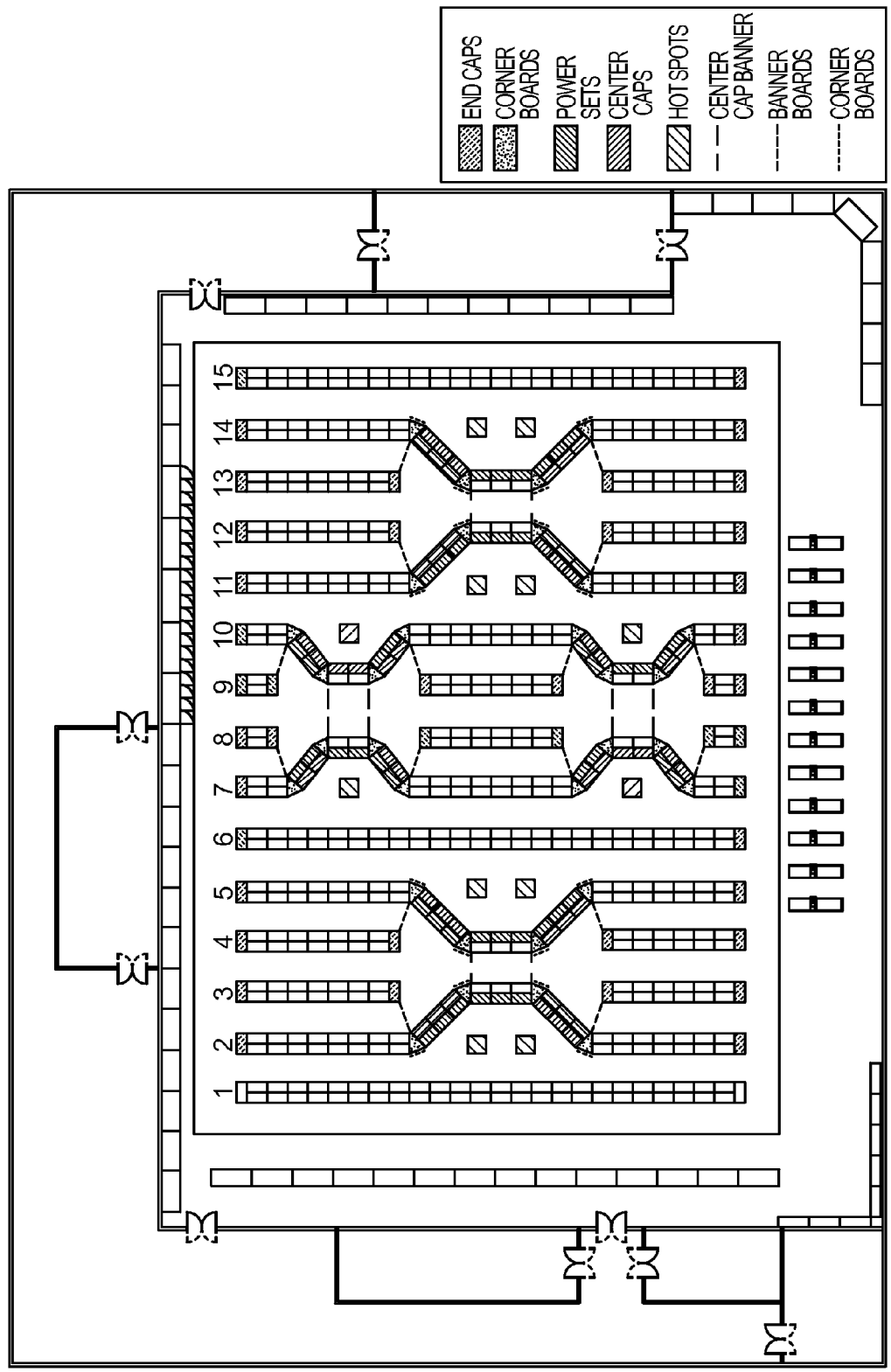
Figure 17:
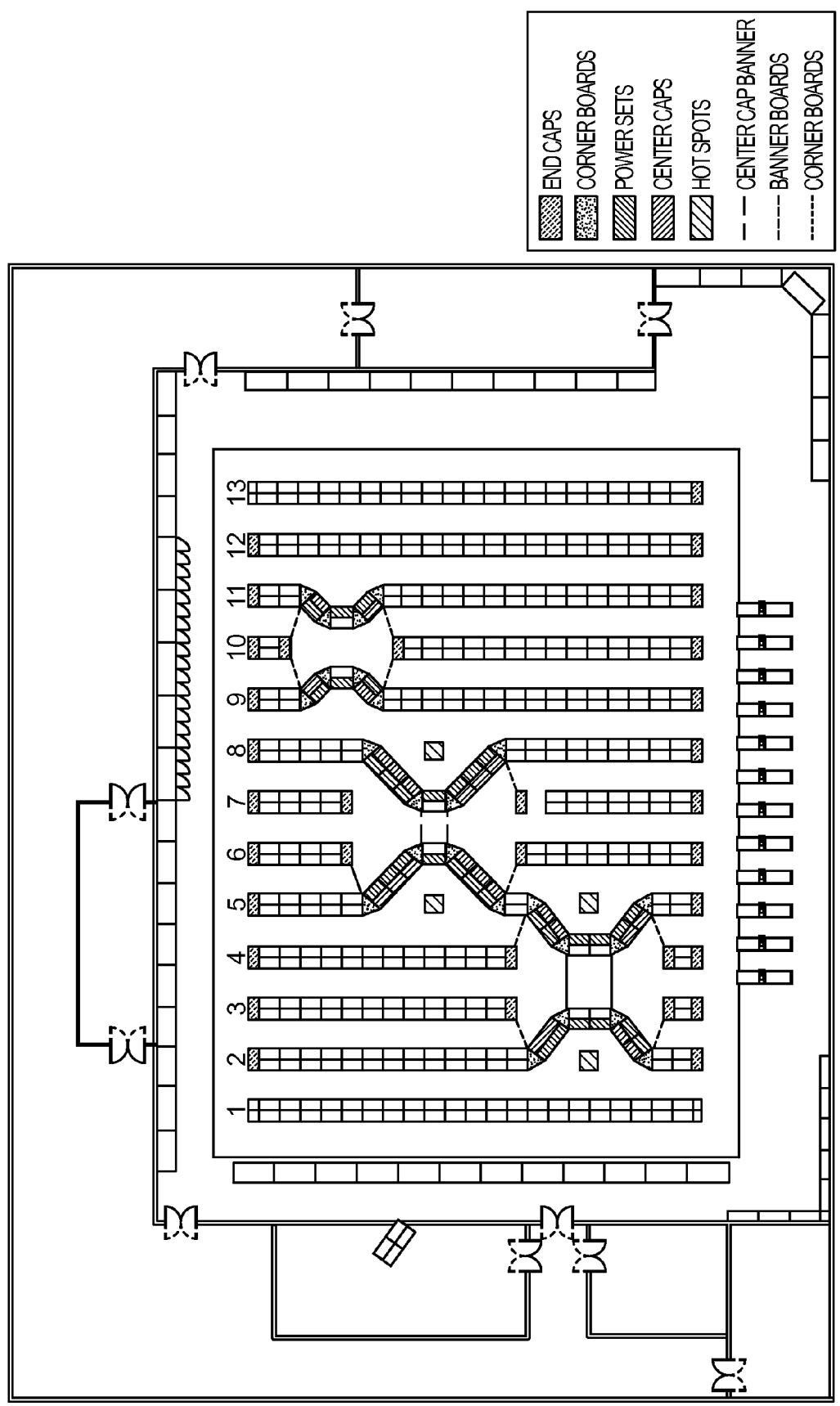

In many jurisdictions, and particularly in those known to experience earthquakes, building codes require that shelving and other heavy objects be anchored to the floor. In accordance with the present invention such anchoring is facilitated by disposing an anchoring bracket 102 (FIG. 11a) between the glider device 70 and the lower end of the shelving leg 100 as depicted in FIG. 11b. In this embodiment, the glider stud 75 is either passed through or threaded through a tapped aperture 104 as the stud is threaded into a tapped bore formed in the end of leg 100. A bolt or lag screw 106 can then be passed through an aperture 108 in the lower flange of the bracket 102 and threaded into a suitable sleeve 110 disposed in a bore formed in the floor. Note that in order that the bracket 102 not interfere with the rolling use of the glider, the lower extremity of the lower flange must be positioned higher than the ball bottoms. A washer of a suitable thickness will allow a secure engagement of the flange to the floor as the bolt 108 is tightened.

FIGS. 12-17 are examples of alternative configurations of the shelving systems within the PrimeZone. The End Caps, Triangular Corners, Power Sets, Center Caps, Hot Spots, Center Cap Banners, Banner Boards and Corner Boards are identified as indicated in the legends.

It is to be understood that although the present invention has been disclosed above with respect to particular exemplary embodiments, it may be embodied in other forms without departing from the spirit, scope or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced herein.

The invention claimed is:

1. A store arrangement of product display units defining a Primezone sub-area within a Center Store area of a store design of the type including a Center Store area having a plurality of long parallel rows of product display units respectively separated by customer walking aisles, the arrangement being implemented by a process comprising:

provulating a first break in a portion of a first row of the Center Store, and a second break in a corresponding portion of an adjacent second row of the plurality of long parallel rows of product display units of the Center Store area;

providing a first Center Cap having an elongated product display system including a plurality of display units and having one end thereof disposed in engagement with an end of a first display unit of the first row and bordering one side of said first break, said first Center Cap being oriented to have the length thereof extending at a first angle relative to the length of the first row and toward said second break;

providing a second Center Cap having one end thereof disposed in engagement with a second display unit of the first row and bordering the other side of the break in the first row, said second Center Cap being oriented to have the length thereof extending at a second angle relative to the length of the first row and toward said second break; and providing first means joining the other ends of the first and second Center Caps to form a first alcove-like Power Set area within and around which to display products;

wherein products disposed on one side of said first Center Cap generally face customers entering the aisle between the first and second rows from one side of the store, and products disposed on one side of said second Center Cap generally face customers entering the aisle between the first and second rows from the opposite side of the store; and wherein one side of said second break in said second row, is bordered by a first End Cap positioned no closer to said first Center Cap than the width of the aisle between said first and second rows, and the other side of said second break is bordered by a second End Cap positioned no closer to said second Center Cap than the width of the aisle between said first and second rows, thereby providing pathways joining said first aisle to said second aisle;

providing breaks in a third row adjacent said second row and in a fourth row adjacent said third row of the plurality of long parallel rows of product display systems in the Center Store area;

providing a third elongated product display system having one end thereof disposed in engagement with a display system forming one side of the break in said fourth row and extending at a first angle relative to the length of the fourth row and toward the break in said third row;

providing a fourth elongated product display system having one end thereof disposed in engagement with a display system forming the other side of the break in said fourth row and extending at a third angle relative to the length of said fourth row and toward the break in the said third row; and providing second means joining the other ends of said third and fourth elongated display systems to form a second alcove-like Power Set area within which to display products, said third and fourth elongated display systems being separated from corresponding sides of the break in said third row to form passageways connecting the customer walking aisle disposed between said third and fourth rows and the customer walking aisle disposed on an opposite side of the third row.

2. A store arrangement implemented by a process as recited in claim 1 wherein said Center Caps are comprised of a plurality of moveable gondolas rigidly linked together.

3. A store arrangement as recited in claim 2 wherein at least some of said movable gondolas are rendered movable by a plurality of supporting glider devices each comprising:

a cylindrical plug having threads formed on its outer cylindrical surface, means formed on one axial end thereof for facilitating attachment to a lower extremity of the gondola to be supported thereby above a supporting surface, and a plurality of roller means affixed to the opposite axial end thereof; and a sleeve having a threaded bore extending axially therethrough and adapted to threadably receive said plug, said sleeve being rotatable about said plug to advance from a retracted position on said plug allowing said rollers to support the gondola to an extended position on said plug raising said roller means out of engagement with the gondola supporting surface.

4. A store arrangement as recited in claim 3 wherein the opposite axial end of said plug includes a plurality of sockets, and said roller means includes a plurality of spherically shaped roller balls disposed in said sockets.

5. A process for providing a PrimeZone sub-area within a Center Store area of a retail establishment, the Center Store area having a plurality of product display systems aligned in a plurality of long parallel rows defining customer walkways therebetween; the process comprising:

providing a first break in a first row of said plurality of long parallel rows of said Center Store area and a corresponding second break in a second row of said plurality of long parallel rows of said Center Store area adjacent said first break;

providing in said first break a first elongated product display system fitted with glider devices adapted to facilitate movement thereof from one position to another, said first product display system having one end thereof disposed in engagement with another display system defining one side of the first break-in said first row;

rotating said first elongated product display system into a position having its length extending at an angle relative to the length of said first row and toward said second break in said second row;

providing in said first break a second elongated product display system fitted with glider devices adapted to facilitate movement thereof from one position to another, said second product display system having one end thereof disposed in engagement with a display system defining the other side of the first break in said first row, said first elongated product display system having its length extending at an angle relative to the length of said first row and toward the second break in said second row;

providing a first means joining the other ends of said first and second elongated display systems to form a first alcove-like Power Set area within which to display products, wherein said first and second elongated display systems are separated from corresponding sides of the second break in said second row to form passageways connecting the customer walking aisle disposed between said first and second rows and the customer walking aisle disposed on an opposite side of the second row:

providing a third break in a third row of said plurality of long parallel rows of said Center Store area adjacent said second row, and a corresponding fourth break in a fourth row of said plurality of long parallel rows of said Center Store area adjacent said third break;

providing in said fourth break a third elongated product display system fitted with glider devices adapted to facilitate movement thereof from one position to another, said third product display system having one end thereof disposed in engagement with another display system defining one side of the fourth break in said fourth row;

rotating said fourth elongated product display system into a position having its length extending at an angle relative to the length of said fourth row and toward said third break in said third row;

providing in said fourth break a fourth elongated product display system fitted with glider devices adapted to facilitate movement thereof from one position to another, said fourth product display system having one end thereof disposed in engagement with a display system defining the other side of the fourth break in said fourth row, said fourth elongated product display system having its length extending at an angle relative to the length of said fourth row and toward the third break in said third row; and providing a second means joining the other ends of said third and fourth elongated display systems to form a second alcove-like Power Set area within which to display products, wherein said third and fourth elongated display systems are separated from corresponding sides of the third break in said third row to form passageways connecting the customer walking aisle disposed between said third and fourth rows and the customer walking aisle disposed on an opposite side of the third row.

6. A store arrangement as recited in claim 5 and further comprising at least one Banner Board extending across the aisle separating said second and third rows.

7. A process as recited in claim 5 wherein said first means includes a fifth elongated display system having one end thereof joined to the other end of said first elongated display system and having a second end thereof joined to the other end of said second elongated display system.

8. A store arrangement of product display units defining a Primezone sub-area within a Center Store area of a store design of the type including a Center Store area having a plurality of long parallel rows of product display units respectively separated by customer walking aisles, the arrangement being implemented by a process comprising:

providing a first break in a portion of a first row of the Center Store, and a second break in a corresponding portion of an adjacent second row of the plurality of long parallel rows of product display units of the Center Store area;

providing a first Center Cap having an elongated product display system including a plurality of display units and having one end thereof disposed in engagement with an end of a first display unit of the first row and bordering one side of the first break, said first Center Cap being oriented to have the length thereof extending at a first angle relative to the length of the first row and toward said second break;

providing a second Center Cap having one end thereof disposed in engagement with a second display unit of the first row and bordering the other side of the break in the first row, said second Center Cap being oriented to have the length thereof extending at a second angle relative to the length of the first row and toward said second break; and providing first means joining the other ends of the first and second Center Caps to form a first alcove-like Power Set area within and around which to display products;

wherein products disposed on one side of said first Center Cap generally face customers entering the aisle between the first and second rows from one side of the store, and products disposed on one side of said second Center Cap generally face customers entering the aisle between the first and second rows from the opposite side of the store; and wherein one side of said second break, in said second row, is bordered by a first End Cap positioned no closer to said first Center Cap than the width of the aisle between said first and second rows, and the other side of said second break is bordered by a second End Cap positioned no closer to said second Center Cap than the width of the aisle between said first and second rows, thereby providing pathways joining said first aisle to an aisle on the opposite side of said second row;

providing a third break in a third one of said plurality of long parallel rows of product display units of the Center Store area adjacent said first row, and a fourth break in an adjacent fourth one of said rows of the plurality of long parallel rows of product display units of the Center Store area;

providing a third Center Cap having one end thereof disposed in engagement with a first display unit of the third row and bordering one side of said third break, said third Center Cap being oriented to have the length thereof extending at a third angle relative to the length of the third row and toward said fourth break;

providing a fourth Center Cap having one end thereof disposed in engagement with a second display unit of the third row and bordering the other side of the break in the third row, said fourth Center Cap being oriented to have the length thereof extending at a fourth angle relative to the length of the third row and toward said fourth break; and providing second means joining the other ends of the third and fourth Center Caps to form a second alcove-like Power Set area within and around which to display products;

wherein products disposed on one side of said third Center Caps generally face customers entering a third aisle between the third and fourth rows from one side of the store, and products disposed on one side of said fourth Center Cap generally face customers entering the third aisle from the opposite side of the store; and wherein one side of said fourth break is bordered by a third End Cap positioned no closer to said third Center Cap than the width of the third aisle, and the other side of said fourth break is bordered by a fourth End Cap positioned no closer to said fourth Center Cap than the width of the third aisle, thereby providing pathways joining said third aisle to an aisle on the opposite side of said fourth row.

9. A store arrangement as recited in claim 8 wherein said first means includes a fifth Center Cap having one end thereof joined to the other end of said first Center Cap and a second end thereof joined to the other end of said second Center Cap.

10. A store arrangement as recited in claim 8 and further including means forming a Hot Spot display unit disposed within a central portion of said first Power Set area.

11. A store arrangement as recited in claim 8 wherein said first Center Cap has a generally rectangular plan form and includes product display units on both sides thereof, and wherein the engagement between said one end of said first Center Cap and said first display unit forming one side of the break in said first row provides a space for accommodating the positioning of a first Corner unit between the facing ends of said first Center Cap and said first display unit.

12. A store arrangement as recited in claim 11 wherein the engagement between said one end of said second Center Cap and said second display unit forming the other side of the break in said first row provides a space for accommodating the positioning of a second Corner unit between the facing ends of said second Center Cap and said second display unit.

13. A store arrangement as recited in claim 12 wherein said first means includes a third Center Cap having one end thereof joined to the other end of said first Center Cap and providing a space for accommodating a third Corner unit, and another end thereof joined to the other end of said second Center Cap and providing a space for accommodating a fourth Corner unit.

14. A store arrangement implemented by a process as recited in claim 13 wherein at least some of said Center Caps are comprised of two rows of moveable gondolas rigidly linked together in parallel to form an elongated display unit accessible from opposite sides thereof.

15. A store arrangement as recited in claim 8 wherein at least said first Center Cap and said second Center Cap are fitted with glider devices adapted to facilitate movement of the product display units from one position to another.

16. A store arrangement as recited in claim 15 wherein said glider devices include:
a cylindrical plug having threads formed on its outer cylindrical surface, attachment means formed on one axial end thereof for fixed engagement with a lower part of the product display system, and a plurality of roller means disposed on the opposite axial end thereof for rollingly engaging a surface supporting the display system; and
a sleeve having a threaded bore extending axially therethrough and adapted to threadably receive said plug, whereby said sleeve may be advanced from a retracted position on said plug to an extended position engaging the supporting surface and raising said roller means out of engagement with the supporting surface thereby leveling and/or fixing the system in position relative to the surface.

17. A store arrangement as recited in claim 16 wherein said roller means are spherical in shape and said opposite axial end of said plug is provided with sockets for matingly receiving the spherical roller means.

18. A store arrangement as recited in claim 8 and further comprising means disposed within a central portion of said first Power Set area defining a Hot Spot area.

19. A store arrangement as recited in claim 8 and further comprising means disposed within central portions of said first and second Power Set areas defining Hot Spot areas.

20. A store arrangement implemented by a process as recited in claim 8 and further comprising providing at least one Banner Board extending across the aisle separating said first and fourth rows.

21. A store arrangement implemented by a process as recited in claim 8 wherein at least some of said Center Caps are comprised of a plurality of moveable gondolas rigidly linked together.

* * * * *